US007765790B2

(12) United States Patent
Clay et al.

(10) Patent No.: US 7,765,790 B2
(45) Date of Patent: Aug. 3, 2010

(54) STATIONARY MECHANICAL ENGINES AND SUBSONIC JET ENGINES USING SUPERSONIC GAS TURBINES

(75) Inventors: Rufus G. Clay, Los Alamos, NM (US); Robert G. Hockaday, Los Alamos, NM (US)

(73) Assignee: Amicable Inventions LLC, Los Alamos, NM (US)

( * ) Notice: Subject to any disclaimer, the term of this patent is extended or adjusted under 35 U.S.C. 154(b) by 0 days.

(21) Appl. No.: 12/411,248

(22) Filed: Mar. 25, 2009

(65) Prior Publication Data
US 2009/0241549 A1 Oct. 1, 2009

Related U.S. Application Data

(60) Provisional application No. 61/039,409, filed on Mar. 25, 2008.

(51) Int. Cl.
*F02K 3/00* (2006.01)
(52) U.S. Cl. .................. 60/269; 60/767; 60/768; 415/181
(58) Field of Classification Search ............ 60/39.37, 60/39.38, 39.39, 39.4, 767, 768, 269; 415/181
See application file for complete search history.

(56) References Cited

U.S. PATENT DOCUMENTS

| | | | |
|---|---|---|---|
| 704,756 A | | 7/1902 | Ray |
| 2,404,609 A | * | 7/1946 | Whittle .................. 415/208.2 |
| 2,455,458 A | * | 12/1948 | Whittle ....................... 60/264 |
| 2,580,207 A | * | 12/1951 | Whittle ....................... 60/264 |
| 2,994,195 A | | 8/1961 | Carswell |
| 3,771,925 A | | 11/1973 | Friberg |

(Continued)

FOREIGN PATENT DOCUMENTS

GB 2165310 A 4/1986

(Continued)

OTHER PUBLICATIONS

H.W. Liepmann et al., Elements of Gas Dynamics, 1957, John Wiley and Sons, Inc., pp. 124-143.*

(Continued)

*Primary Examiner*—William H Rodríguez
(74) *Attorney, Agent, or Firm*—Michele L. Mayberry; New River Valley IP Law

(57) ABSTRACT

A ramjet engine (3, 4, 5), flying at Mach 3 has 64% efficiency, and at Mach 4 has 76% efficiency. Ramjet engines are currently only used for supersonic flight and have not been used as stationary engines with mechanical output. The present invention, in addition to subsonic flight, can be operated as a stationary engine, and can expand the use of the ramjet engine for mechanical output in vehicles, power plants, and in generator sets for large buildings, homes, and industry. The present invention provides the means to use ramjet engines as stationary engines by building nearly adiabatic compressors (1, 2, 12, 13, 14, 15) and expanders (6, 7, 8, 9, 10, 11) capable of (de-)compression ratios up to about 92:1 to supply the high energy gas/air required by ramjet engines, and shows how to replace de Laval nozzles with sonic converters (49, 50, 51) that convert supersonic to subsonic flow and sonic converters (45, 46, 47) that convert subsonic to supersonic flow without having choke areas.

16 Claims, 11 Drawing Sheets

U.S. PATENT DOCUMENTS

| | | | |
|---|---|---|---|
| 3,837,760 A | 9/1974 | Stalker | |
| 3,917,434 A | 11/1975 | Bandukwalla | |
| 3,937,009 A | 2/1976 | Coleman | |
| 3,964,254 A | 6/1976 | St. John | |
| 4,006,997 A | 2/1977 | Friberg | |
| 4,336,693 A | 6/1982 | Hays | |
| 4,375,938 A | 3/1983 | Dussourd | |
| 4,707,978 A | 11/1987 | Garcia | |
| 4,770,606 A | 9/1988 | Kuroiwa | |
| 4,808,090 A | 2/1989 | Evans | |
| 4,860,610 A * | 8/1989 | Popper et al. | 74/572.4 |
| 4,930,309 A | 6/1990 | Hartman | |
| 4,966,527 A | 10/1990 | Merz | |
| 5,044,887 A | 9/1991 | Duthie | |
| 5,123,811 A | 6/1992 | Kuroiwa | |
| 5,231,825 A | 8/1993 | Baughman | |
| 5,308,228 A | 5/1994 | Benoit | |
| 6,047,540 A * | 4/2000 | Dev | 60/805 |
| 6,347,507 B1 | 2/2002 | Lawlor | |
| 6,405,703 B1 | 6/2002 | Sowards | |
| 6,439,843 B1 | 8/2002 | Finkenbinder | |
| 6,446,425 B1 | 9/2002 | Lawlor | |
| 6,452,301 B1 * | 9/2002 | Van Dine et al. | 310/156.12 |
| 6,510,683 B1 | 1/2003 | Lawlor | |
| 6,661,145 B1 * | 12/2003 | Nilson | 310/156.22 |
| 6,717,114 B2 | 4/2004 | Austin | |
| 6,824,861 B2 | 11/2004 | Spears | |
| 6,852,401 B2 | 2/2005 | Spears | |
| 7,273,352 B2 | 9/2007 | Williams | |
| 7,334,990 B2 | 2/2008 | Lawlor | |
| 7,337,606 B2 | 3/2008 | Brouillette | |
| 7,434,400 B2 | 10/2008 | Lawlor | |
| 7,462,948 B2 | 12/2008 | Toriyama | |
| 2003/0000336 A1 * | 1/2003 | Tsai | 74/572 |
| 2003/0101844 A1 * | 6/2003 | Gabrys | 74/572 |
| 2003/0110615 A1 * | 6/2003 | Ku et al. | 29/596 |
| 2003/0146670 A1 * | 8/2003 | Van Dine | 310/216 |
| 2003/0192184 A1 * | 10/2003 | Hache | 29/888.02 |
| 2004/0042895 A1 | 3/2004 | Seki | |
| 2005/0036897 A1 | 2/2005 | Kasmer | |
| 2005/0126175 A1 | 6/2005 | Badgley | |
| 2007/0122606 A1 | 5/2007 | Meier | |
| 2007/0151226 A1 | 7/2007 | Schlote | |
| 2008/0131283 A1 | 6/2008 | Elsaesser | |
| 2009/0072639 A1 * | 3/2009 | Seneff et al. | 310/43 |

FOREIGN PATENT DOCUMENTS

| | | |
|---|---|---|
| WO | WO 2004/099588 A2 | 11/2004 |
| WO | WO2007/129032 A1 | 11/2007 |

OTHER PUBLICATIONS

Zucrow, J. M., Aircraft and Missile Propulsion, 1958, John Wiley & Sons, Inc., vol. I, pp. 95-99.*

Zucrow, J. M., Aircraft and Missile Propulsion, 1958, John Wiley & Sons, Inc., vol. II, pp. 348-351.*

Walter J. Hesse et al., Jet Propulsion for Aerospace Applications, 1958 & 1964, Pitman Publishing Corporation, Second edition, pp. 382-385.*

Franklin P. Durham, Aircraft Jet Power Plants, 1951, Prentice-Hall, Inc, pp. 255-256.*

Jack V. Casamassa et al., Jet Aircraft Power Systems, 1957, McGraw-Hill Book Company, Inc., Second edition, pp. 57-58.*

International Search Report and Written Opinion for corresponding PCT Application No. PCT/US2009/038244.

* cited by examiner

STATIONARY MECHANICAL ENGINES AND SUBSONIC JET ENGINES USING SUPERSONIC GAS TURBINES

CROSS-REFERENCE TO RELATED APPLICATIONS

This application relies on the disclosure and claims the benefit of the filing date of U.S. Provisional Application No. 61/039,406 filed Mar. 25, 2008, the disclosure of which is hereby incorporated by reference in its entirety.

BACKGROUND OF THE INVENTION

1. Field of the Invention

This invention relates to the field of power plants. More particularly, the present invention relates to devices and methods used in the field of heat engines for various applications including mechanical drives. Embodiments of the present invention provide subsonic and stationary ramjet engines.

2. Description of the Related Art

To conserve fossil fuels and reduce the worldwide production of carbon dioxide, $CO_2$, the most effective method is to increase the efficiency of automobile engines and other fuel burning engines. The efficiency of the average automobile engine on the road in the United States is approximately 21%. An automobile engine with 21% efficiency burns three times as much fuel as an automobile engine with 63% efficiency. Ramjet engines possess 63% efficiency and higher.

Ramjet engines have been around for 50 years, and are famous for high efficiency, yet, today, ramjets have virtually no commercial applications other than military. There are reasons for that. Supersonic speed generates shockwaves and shockwaves waste energy. Unless an aircraft flies at very high altitude where air is much less dense, it will consume a great deal of fuel by flying supersonically. So there is little economic demand for commercial supersonic aircraft. But there is some demand, and it is not being met by ramjet engines even though they are much more efficient than turbine engines.

The words supersonic and subsonic usually refer to speed of sound in the ambient atmosphere. Inside the apparatus of this invention speed of sound changes with temperature, and the words supersonic and subsonic usually refer to local speed of sound in the air or gas under those conditions. The speed of sound can vary by a factor of two in the same air or gas traveling through the apparatus. Mach speeds almost all refer to speed of sound in the atmosphere.

Ramjets use de Laval nozzles to convert supersonic speed air to subsonic and vice versa with the flow reversed in the nozzle. De Laval nozzles are highly efficient devices known for over a century. An input de Laval nozzle slows down supersonic air by reducing the area of a tube containing the flow to what is known as the choke area, where the air reaches local speed of sound. Beyond the choke area the nozzle increases the area of flow to further slow down the air. The faster the nozzle moves through the air, the more air can pass through the same choke area, because the high kinetic energy of the air relative to the nozzle is converted into higher temperature and higher density in a de Laval nozzle. But, for each airspeed, the rate at which air can pass through the choke area is fixed. The choke area regulates the rate of flow at every energy level of the air. There is a choke area in the input nozzle to the ramjet engine and there is a choke area in the output nozzle from the engine. Both of these areas regulate the rate of flow of air/gas. And that is a problem. They have to be coordinated—at supersonic speed. It is not impossible, but it is very difficult. If an output subsonic to supersonic de Laval nozzle does not receive enough flow, it will not make the isentropic conversion to supersonic, and thrust from the exhaust is reduced. If it receives too much flow, some gas is pushed back, making the pressure in the combustion chamber go up. If the pressure in the combustion chamber goes up, the front or input de Laval nozzle gets backed up.

Another problem with ramjet engines is that they only work at supersonic speeds. A ramjet engine cannot be used inside an ordinary room, because flying at supersonic speed requires faster turns than the engine can survive, even if it is held by a very long arm. Stationary testing of ramjet engines is possible, in a supersonic wind tunnel, but that is not a practical way to get mechanical power from the ramjet engine. Further, the use of paired de Laval nozzles is one limiting factor keeping ramjet engines from being more widely used in aircraft.

SUMMARY OF THE INVENTION

In light of the above-described issues with current ramjet engines, it is an object of some of the preferred embodiments of the present invention to show how to run a stationary ramjet engine to obtain mechanical power. Further, some disclosed embodiments of the present invention will show how to replace a de Laval nozzle with a supersonic to subsonic convertor which does not have a choke area. Some embodiments of the present invention, even further, will show how to generate nearly or approximately adiabatically from the same atmosphere the high energy flows of air and other gas which let the ramjet engine operate at high efficiency. The term "adiabatically" typically means without any heat flow into or out of the air or gas, which is possible only approximately. Still further, some embodiments of the present invention will show how to output the power of a ramjet engine as mechanical work. In addition, by using a ramjet engine with these methods, it is possible in some preferred embodiments to remove all significant shockwaves from the process and eliminate wasteful drag, so useful energy is not wasted. Some shockwaves in supersonic flight cannot be removed but some shockwaves at the leading edges of the engine are removed by having the engine stationary. The remaining shockwaves should be insignificant.

A choke as used in this description refers to restraining, guiding, and/or bounding a flow transitioning from locally supersonic to locally subsonic or transitioning from locally subsonic to locally supersonic on all sides of the flow through a smaller fixed area. In the context of this invention, when referring to a no-choke area or a region without a choke area, what is meant is that the structure does not force the air or gas flow undergoing a local speed of sound transition through a fixed area bounded on all sides. For example, a rotor does not force all flow through one or more de Laval nozzles, and an annulus with spiraling outward flow allows the flow of air or gas transitioning through local speed of sound to spread out radially to occupy the needed area, and a vent does not include a sonic transition. There is no area restraint of the sonically transitioning flow, i.e., the flow can spread out in at least one direction.

Aside from mechanical engineering and physics, the science applied in this patent uses in part the science of high speed gas dynamics. For example, *Gas Dynamics*, by James E. A. John, Theo G. Keith, (2005), is a widely used text addressing the subject.

DETAILED DESCRIPTION OF VARIOUS EMBODIMENTS OF THE INVENTION

Figure 1:
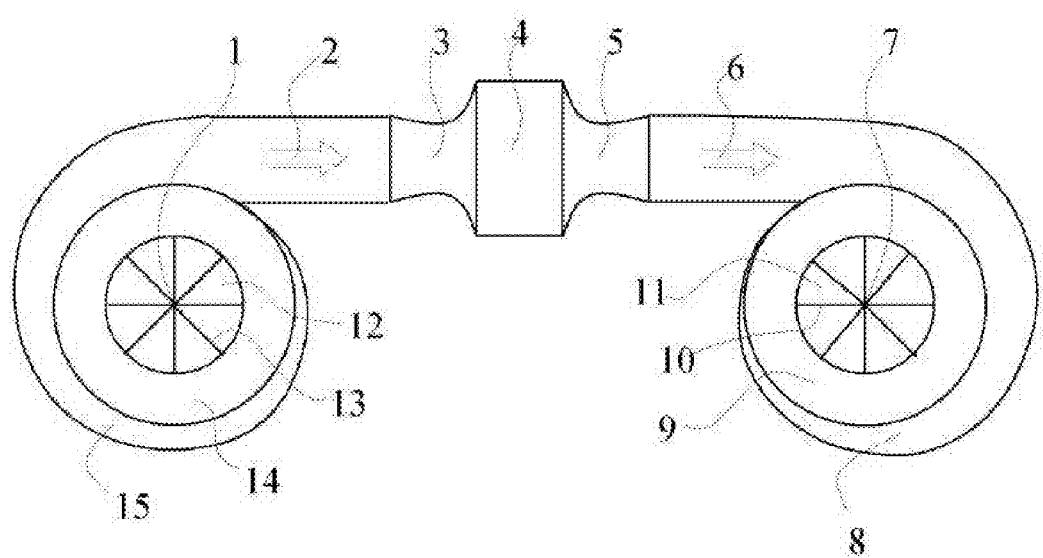
FIG. 1 is a schematic diagram of one embodiment of a compressor, ramjet, and expander in accordance with the invention.

Reference will now be made in detail to various exemplary embodiments of the invention. The following detailed description is presented for the purpose of describing certain embodiments in detail and is, thus, not to be considered as limiting the invention to the embodiments described. Rather, the true scope of the invention is defined by the claims.

Temperatures herein are generally expressed in absolute degrees Kelvin, sometimes in degrees Centigrade, and room temperature is approximately 294 K. Atmospheric air or gas is air or gas at ambient pressure and temperature. If atmospheric temperature is $T_0$ K, and that air or gas is adiabatically changed to have a stagnation temperature of $T_s$ K by some means, this result is referred to herein as "high energy" air or gas if the stagnation temperature Ts K is 3 times $T_0$ K or higher. High energy air/gas has a specific energy approximately $T_s/T_0$ times the specific energy of the air/gas at atmospheric conditions of temperature and pressure. Even at temperature $T_0$ K, ordinary atmospheric air/gas has stagnation temperature $T_s$ K=3 $T_0$ K traveling at Mach 3.162, and Ts K increases with the square of the Mach number.

"Specific" tensile strength of a material is its tensile strength divided by its specific gravity, which is its density divided by the density of water. Similarly "specific" compressive strength is compressive strength divided by specific gravity. Specific strength is the figure of merit in rotor materials because forces are proportional to specific gravity.

"Mach" numbers usually refer to the speed of sound in the local atmosphere. The speed of sound can change by a factor of 2 or more in a ramjet engine. When the words "supersonic" and "subsonic" are used in this text they refer to the speed of sound in the gas/air which has been compressed, which is also called "local" speed of sound in air/gas. A temperature increase makes the speed of sound increase in air/gas. As used herein, the term "adiabatically" refers to its common meaning and is typically used to mean "without appreciable heat being added or subtracted." The term is always only approximately accurate at best.

Included in the invention are devices, systems, and methods of energy generation including an apparatus, optionally without a choke area, for generating a locally subsonic flow of air or gas having stagnation temperature 1.5-10 times input air or gas absolute temperature, comprising: a compressor comprising: a rotor, optionally without a choke area, capable of accelerating air or gas to a flow with locally supersonic speed; and a chamber capable of receiving and decelerating, optionally without a choke area, locally supersonic flow to locally subsonic speed and outputting the flow through a vent, optionally without a choke area.

Further included is any apparatus herein wherein the rotor is capable of sustained rotation at a design surface speed of from about 2000 feet/second up to about 5400 feet/second and capable of accelerating the air or gas flow to about the surface speed of the rotor.

The invention additionally includes embodiments of any apparatus herein wherein the rotor further comprises: a shaft of high specific tensile yield strength material centered on an axis of revolution, also referred to as an axis of rotation; structural blades and optionally rotor sides of high specific compressive strength material operably connected to the shaft by high specific tensile strength fiber tow.

Any apparatus herein wherein at rest the structural blades are operably connected to the shaft under a compression from about 50,000 psi to about 500,000 psi is also within the scope of the invention.

Still further, the invention includes embodiments of any apparatus herein, such as compressors and/or expanders, which comprise high specific tensile strength fiber tow optionally coated or infiltrated with metals or ceramics whereby a bonded or coherent flexible sheet or rigid solid, e.g., stiff sheet, is formed.

Additionally, embodiments of any apparatus herein can comprise high specific tensile strength fiber tow comprising at least one of nanotube composite fiber, carbon fiber, glass fiber, metal and ceramic fiber, ceramic fiber, and polymer fibers, or any combination thereof.

Embodiments of the invention may comprise any apparatus herein comprising high specific compressive strength material comprising at least one of alpha silicon carbide, boron carbide, ceramic, diamond like materials, metal, and polymer, or any combination thereof.

Further embodiments may include any apparatus herein wherein the high specific tensile yield strength material comprises at least one of alpha silicon carbide wound with carbon fiber coated with diamond like materials, steel worked by twisting on the shaft axis, titanium alloy heat treated for maximum tensile yield strength, and metal or ceramic or polymer, or any combination thereof.

Devices according to the invention can include any apparatus herein comprising a shaft with axial hollows or bores centered on the axis of rotation and rotor radial vents between the structural blades, wherein the hollows or bores and radial vents are capable of providing a passageway for air or gas into the compressor; optionally a plurality of shells operably associated with opposing edges of the structural blades that extend outward from the shaft, wherein the shells are capable of bounding air or gas between the structural blades; optionally a thermally insulated housing for at least a portion of the shaft and rotor comprising: an annulus surrounding at least part of the rotor and capable of receiving locally supersonic air or gas flow from between the structural blades and shells and capable of modifying the flow to locally subsonic speed without a choke area; and a chamber capable of receiving the locally subsonic flow from the annulus, wherein the chamber is a spiral chamber having an outwardly spiral wall and opposing top and bottom inner surfaces capable of bounding air or gas within the spiral chamber, and wherein the spiral chamber is capable of leading flow to a vent.

An apparatus according to any apparatus herein capable of producing compression ratios in the range of about 10:1 to about 92:1 from room temperature air is also included in the scope of the invention.

Operating any compressor according to the invention in reverse is also feasible. For example, embodiments of the invention include any compressor apparatus herein capable of operating as an expander when flow and rotation are reversed and vice versa.

Any apparatus herein according to the invention can comprise opposing inner surfaces of the annulus having shapes that produce during operation a smooth flow with circumferential speed inversely proportional to a distance from the axis; and/or an annulus having an outer diameter selected such that, during operation, a locally supersonic flow is modified to locally subsonic speed within the annulus; and/or the annulus has no choke area.

Also included as an embodiment of the invention is any apparatus herein comprising an adjustable strip or belt located inside the spiral wall of the spiral chamber around the annulus capable of being moved away from the spiral wall to follow the natural spiral shape of the flow and to limit radial flow.

Engines are also included within the scope of the invention. Engines in accordance with the invention can comprise a compressor and/or expander according to the invention. For example, included is a ramjet engine capable of operating as a stationary or subsonic ramjet engine with locally supersonic output comprising: a compressor capable of accelerating air or gas to a flow with locally supersonic speed; a chamber capable of receiving and decelerating, without a choke area, locally supersonic flow to locally subsonic speed and outputting the flow through a vent; and a partial input de Laval nozzle for receiving locally subsonic flow from the vent wherein the partial input de Laval nozzle is configured such that the high speed flow area and choke area are missing or not used; and optionally a combustion chamber for receiving the flow from the input de Laval nozzle.

Included further is a ramjet engine comprising a partial output de Laval nozzle capable of receiving locally subsonic air or gas from the combustion chamber and capable of accelerating the flow to input at locally subsonic speeds to an expander vent, wherein the partial output de Laval nozzle is configured such that the choke area and higher speed regions are missing or not used; wherein the expander vent feeds flow to a chamber capable of leading flow to an annulus capable of receiving and accelerating locally subsonic flow to locally supersonic speed without a choke area; wherein the annulus is capable of leading flow to an expander rotor capable of decelerating locally supersonic flow to locally subsonic speed and reduced temperature; and an expander shaft capable of driving loads with high energy removed from combustion products by the rotor.

A ramjet engine in accordance with the invention may include any ramjet engine herein wherein each of the compressor, the ramjet, and the expander has a housing capable of being fastened together to form one housing.

Also, a ramjet engine in accordance with the invention may include any ramjet engine herein wherein each of the compressor, the ramjet, and the expander has a housing capable of being attached to a common frame.

A compressor and/or expander in accordance with the invention herein may include embodiments comprising any expander or compressor herein wherein a circular ring is disposed beyond outer blade edge radius of the blades and operably associated with the rotor, wherein the circular ring comprises at least one of fiber mat, porous material, or metal mesh and comprises small flow channels, such that during operation air or gas flow is capable of passing between the structural blades and flowing through the ring; and an annular space exists inside the rotor between the outer blade edge radius and the ring.

A compressor and/or expander in accordance with the invention herein may include embodiments comprising any expander or compressor herein wherein carbon fiber windings are disposed circumferentially around the outer blade edges, wherein the winding is capable of permitting radial air or gas flow to pass from between the blades to the annulus at subsonic speeds relative to the rotor.

A compressor and/or expander as described herein may include embodiments comprising any expander or compressor herein wherein additional blades are attached to the shaft between the structural blades and comprise PAN carbon fiber tow pressed together and coated or infiltrated with metals or ceramics to form a bonded flexible sheet.

Further, a compressor and/or expander in accordance with the invention herein may include embodiments comprising any expander or compressor herein wherein the shells have an outer surface shape within about one-half inch of the shell radius and facing the housing; and/or the housing further comprising rings facing the outer surfaces of the shells and separated from the shells during operation by a gap of from about 0.0002 inch to 0.002 inch.

A compressor and/or expander in accordance with the invention herein may include embodiments comprising any expander or compressor herein wherein the outer surface shape of the shells have grooves angled such that during operation of the rotor at Mach speeds the grooves and gap direct air or gas toward larger radiuses, and thereby deter flow in an opposing direction around the rotor.

Additionally, a compressor and/or expander in accordance with the invention herein may include embodiments comprising any expander or compressor herein wherein the opposing surfaces have short fibers embedded in the surfaces; and/or wherein the fibers have diameters of about 4-6 microns, smooth and circular cylindrical surfaces, and are spaced by distances greater than their diameters; and/or wherein the fibers are capable of protruding into the flow more than about 3 times their diameters out of the opposing surfaces and capable of bending toward the surfaces when high speed air or gas flow occurs parallel to the surfaces.

Compressors and/or expanders in accordance with the invention herein may include embodiments comprising any expander or compressor herein further comprising a rotor sealing ring disposed in the housing between the rotor and the annulus with a gap from about 0.0002 inch to 0.002 inch between the rotor sealing ring and the rotor; and/or oriented grooves on the surface of the rotor sealing ring and the outer surface of the shell to direct the air or gas between the ring and the rotor to greater radii, thereby deterring flow in an opposing direction.

Still further, a compressor and/or expander in accordance with the invention herein may include embodiments comprising any expander or compressor herein wherein the combustion chamber has a length of about three to one thousand times its width; and/or the combustion chamber is insulated against heat loss so as to provide during operation less than about 1% loss of energy or efficiency.

A ramjet engine in accordance with the invention herein may include embodiments comprising any ramjet engine herein wherein the combustion chamber comprises an increasing or reducing internal flow area capable of increasing air or gas flow toward local speed of sound and capable of reducing air or gas maximum temperature by up to about 270 degrees centigrade.

Even further, a ramjet in accordance with the invention herein may include embodiments comprising any ramjet engine herein comprising one or more of means for providing inert gas or non-reacting gas for circulation through the compressor, and ramjet engine as working gas of the engine; a heating supply to heat the working gas in the combustion chamber chosen from solar radiation or heat exchange from an external heat source; means for re-circulating exhaust gas to the compressor; means for cooling the exhaust gas to a temperature close to or below atmospheric temperature before inputting to the compressor.

A ramjet in accordance with the invention herein may include embodiments comprising any ramjet engine herein wherein the compressor and expander are on one shaft; compressor and expander portions of the shaft are separate, capable of allowing air or gas to input or output through four ends of the hollow portions of the shaft; the compressor and expander portions of the shaft are connected by a solid shaft on the axis extending into each shaft and supported by radial walls inside the compressor shaft and ending at a solid portion of the expander shaft near the middle of the expander rotor.

Additionally, a ramjet in accordance with the invention herein may include embodiments comprising any ramjet engine herein wherein the compressor and expander are on one shaft; the shaft of the compressor is not hollow and is smaller in diameter than the expander portion of the shaft except near middle of the compressor rotor; the compressor is capable of allowing air or gas to input to the compressor through a cutaway volume of the shaft inside the housing and shells; the compressor shaft extends into the expander shaft and is connected to a solid portion of the expander shaft near the middle of the expander rotor.

Other embodiments of a ramjet in accordance with the invention herein may include embodiments comprising any ramjet engine herein wherein the shaft is hollow and capable of allowing output air or gas to pass through the hollow; the compressor and expander are on the same shaft; the compressor portion of the shaft hollow has no radial vents; the compressor is capable of allowing air or gas to input to the compressor through a cutaway volume of the shaft inside the housing and shells; and/or the compressor has circular openings in the housing and shell facing the housing around the shaft capable of allowing air or gas to pass through the openings into the compressor.

Ramjet engine embodiments in accordance with the invention herein may include embodiments comprising any ramjet engine herein wherein the compressor and the expander are on one shaft hollowed or bored from each end with a solid portion of the shaft dividing input and output flow areas of each of the compressor and the expander.

Even further, ramjet engine embodiments in accordance with the invention herein may include embodiments comprising any ramjet engine herein wherein a shell on the compressor rotor comprises a first opening at a radius to allow air or gas to enter on a side of the shell facing the housing; the housing facing the side of the shell on the compressor rotor comprises a second opening at a smaller radius; on the compressor rotor a porous material or fiber mat supported by high tension fiber tow windings occupies the first opening and between the shell and the shaft and extends toward the housing and is capable of rotating with the shaft; the compressor shaft and expander shaft are hollow, the compressor shaft has no radial vents, and the radial vents in the expander shaft have an area selected to be capable of accommodating exhaust flow from the expander through two ends of the shaft.

Also included in the invention is a method of organizing air or gas flow to create an engine, comprising: accelerating and compressing air or gas in ambient atmosphere by performing work on the air or gas to achieve a target air or gas flow, followed by; decelerating and compressing the air or gas flow to near stagnation temperature flow performing no work on the flow, followed by; heating the air or gas flow at approximately constant pressure remaining near stagnation temperature, followed by; accelerating and decompressing the air or gas flow performing no work on the flow, followed by; decelerating and decompressing the air or gas flow by having the flow perform work, and producing exhaust from the air or gas flow, wherein the exhaust is capable of producing thrust. Embodiments also include methods of organizing air or gas flow, wherein one or more of the above actions is optional.

Embodiments of the invention include a method of decelerating the flow of air or gas comprising guiding air or gas in the direction of convergence between two surfaces that converge over a selected distance by way of a curved surface annulus, and devices for carrying out the method.

Embodiments of the invention include a method for converting supersonic flow to subsonic flow or converting subsonic flow to supersonic flow comprising decelerating supersonic flow or accelerating subsonic flow without a de Laval nozzle, or a choke area, and devices for carrying out the method.

To recreate inside a ramjet engine the conditions of flight at Mach speed M in an atmosphere at temperature $T_0$ K, it is sufficient to compress air with low heat loss to the point where its stagnation temperature, $T_s$ K, equals the stagnation temperature of air inside the ramjet engine, at sufficient mass per second flow rate to match or exceed the ramjet engine in flight. FIG. 1 is a schematic diagram showing how specific functional components may be arranged. For example, FIG. 1 shows a schematic diagram of one embodiment of a compressor, ramjet, and expander. For ease of reference, various points of interest within FIG. 1 are referred to by the terms provided in Table 1.

TABLE 1

Reference for Points of Interest Labeled in FIG. 1

1. Axis of compressor
2. Supersonic flow from compressor
3. De Laval nozzle - Supersonic to subsonic convertor
4. Subsonic flow with heat addition/combustion chamber
5. De Laval nozzle - Subsonic to supersonic convertor
6. Supersonic flow to expander
7. Axis of decompressor/expander
8. Spiral inward flow
9. Radial channel
10. Radial blades
11. Radial channels of expander
12. Radial channels of compressor
13. Radial blades of compressor
14. Radial channel
15. Spiral outward flow The compressor 1, 12, 13, 14, 15 outputs air/gas 2 to the entry de Laval nozzle 3. The air/gas is passed through the heating area 4, which is generally called the combustion chamber. The heated air/gas exits through the rear de Laval Nozzle 5 and enters the expander 6. There are various ways to do this, and preferred ways will be shown in FIG. 2 through FIG. 10. In FIG. 1 if the output 2 of the compressor 1, 12, 13, 14, 15 is supersonic it can be fed directly into the de Laval nozzle 3 at the front of the ramjet engine 3, 4, 5 at the point in the input de Laval nozzle where the air flow speeds match. For example, the supersonic flow exiting from the compressor is received by the input de Laval nozzle at a point within the de Laval nozzle capable of accommodating supersonic flow. If the output of the compressor 2 is subsonic it can be fed into the subsonic part of de Laval nozzle 3, after the nozzle's higher speed sections are removed. The conditions in the combustion chamber 4 in the ramjet engine 3, 4, 5 will be the same as in flight at Mach M in the same atmosphere, and the ramjet engine will reach the efficiency of flight. In various embodiments of this invention, the ramjet engine 3, 4, 5 may be stationary or moving.

To use the ramjet engine 3, 4, 5 as a jet, fuel is added and burned, or heat is added, to the gas in the combustion chamber 4 and the de Laval nozzle 5 at the rear of the ramjet engine converts the subsonic flow to supersonic, creating a jet output, not shown, which does not enter the expander.

To use the ramjet engine 3, 4, 5 as a mechanical engine, some or all of the jet output 6 can be confined to the input to a diffuser or expander 7, 8, 9, 10, 11 which outputs mechanical energy on a shaft 7, and outputs exhaust, not shown. The ramjet engine's rear de Laval nozzle 5 can be truncated at the cross section where the output matches the input speed of the input to the expander 6.

Described in the following is a single stage compressor with shaft 1 turning blades 13 attached to the shaft with air/gas entering between blades 12 traveling at rim speeds of from about 2000 feet/second up to 5400 feet/second, 14, which flow spirals outward in the housing 15 and exits through a vent as supersonic flow output 2 into the ramjet engine's front end de Laval nozzle 3, matching flow speeds in the nozzle, and also described is a single stage expander with shaft 7 being turned by blades 10 which are driven by air/gas 6, 11 being slowed down by the blades, which form a supersonic rotor 10, 11, traveling at rim speeds 9 of from about 2000 feet/second up to 5400 feet/second, which takes supersonic input 6 from the ramjet engine's rear de Laval nozzle 5 and spirals it inward to the blades, generating mechanical output plus exhaust.

Further described is a means to replace a ramjet engine's front, or input, de Laval nozzle 3 with a supersonic to subsonic convertor which does not have a choke area, and to replace a ramjet engine's rear, or output, de Laval nozzle 5 with a subsonic to supersonic convertor which does not possess a choke area.

Also shown is how to modify a supersonic rotor compressor 12, 13 operating at the same rotational speed to output subsonic flow with the same total high energy without its flow experiencing a choke area, and to convert a supersonic expander 7, 8, 9, 10, 11 operating at the same rpm to input subsonic flow with the same total high energy without its flow experiencing any choke area.

To begin those descriptions, a rotor on a shaft which can operate at rim speeds of from about 2000 feet/second to about 5400 feet/second will be described, as well as methods of manufacturing such a device. To build such a rotor a material comprising high specific tensile yield strength is obtained for a shaft. As used herein for a shaft, "high specific tensile yield strength" has a specific tensile yield strength in the range of about 46,000 to 47,000 psi. In one embodiment, the high specific tensile yield strength has a specific tensile yield strength above 46,000 psi. For example, steel music wire and one reported type of Titanium beta-C have very high specific tensile yield strength among metals. But these materials are not in the same ballpark as some carbon fibers which have specific tensile yield strengths about 10 times greater. High specific tensile strength fiber tow is also obtained for holding the rotor parts, optionally under high tension. In the future, tow made from fibers made from carbon nanotubes may be better; for now the preferred high specific tensile strength material is carbon fiber. Most carbon fiber has about the same specific gravity, and some is available with ultimate tensile strength, around 1,000,000 psi, which is higher than necessary for embodiments of this invention. As used herein, for carbon fiber, "high specific tensile strength" has a specific tensile strength in the range of about 400,000-465,000 psi. In one embodiment, the high specific tensile strength material has a tensile strength above about 400,000 psi. Carbon fiber is not hard and it can wear against most materials, including itself. In order to reduce or eliminate wear or deformity of the rotor, the fiber can be coated with a thin layer of high temperature wear resistant material, such as metal or ceramic. The elastic properties of, for example, PolyAcryloNitrile, or PAN, based carbon fiber, usually called "PAN carbon fiber," are very different from the elastic properties of metals. PAN carbon fiber can stretch elastically up to about 2% without deforming. At temperatures much higher than the temperatures the fiber is exposed to in embodiments of this invention, the fiber does not yield, creep, or deform as metals do. Most metals have an elastic stretching limit around $\frac{1}{10}^{th}$ as large as PAN carbon fiber.

PAN carbon fiber is used as a tensile construction material in the rotor, somewhat like wire is used in suspension bridges, in such a way that throughout the on-off cycles of the rotor, the PAN carbon fiber does not change length more than the elastic limit of the materials coating the fiber. A high specific compressive strength material is used, such as alpha silicon carbide, because of its low specific gravity combined with high compressive strength, its high modulus of elasticity and excellent high temperature strength and oxidation resistance. As used herein, "high specific compressive strength" material has a compressive strength in the range of about 80,000 to 180,000 psi. In one embodiment, the high compressive strength material has a compressive strength above about 160,000 psi. Exemplary types of high compressive strength materials that can be used are discussed in more detail below.

The SiC is not exposed to temperatures close to the maximum temperatures in the ramjet engine. One way to achieve this is to place the SiC under high compression, approximately the force it will exert as centrifugal force at maximum speed, using the PAN carbon fibers while the device is not running, such that when the device is running at maximum speed, the SiC remains in place still under compression and only slightly expanded from the stationary compression. This slight expansion, for example, may be in the range of about 0.2% to 0.3% for a Mach speed of 4. At design speed the pressure of a part on the shaft may be about 10,000 psi or higher. The part helps reinforce the shaft against centrifugal forces. The PAN carbon fiber acts as powerful sinews while the alpha SiC acts as the strong bones in a very stiff combination. PAN carbon fiber can also be used to make flexible blades using fibers wound on a fiber shape with predominantly radial orientation. The fiber shape can be tied to the rotor and to stiff walls on the rotor, or to fiber stretched around the rotor. Bonding materials such as metal coatings or castable ceramics can coat or infiltrate the fibers to help protect the fiber.

Before winding, the PAN carbon fiber can be coated with a thin film of metal or ceramic to provide a wear resistant coating for the soft fibers. The soft fibers are then stretched to 1% or more elongation, which is about half of their maximum tension, and held under that tension while they are wound to compress the SiC parts. The coating protects the soft carbon fibers from being abraded by one another and by the hard SiC during their application. The coating is metal, or perhaps ceramic, and can provide protection for the fibers during operation in situations where the polymers are not expected to survive the temperatures encountered by the fibers. The first fiber coating may be applied after stretching the fibers. After the fibers are applied, a further bonding coating and/or filler materials may be applied to reduce relative motion of the coated fibers or to block air or gas flow through the fibers. The structural strength fibers elongate and shrink during on-off cycles for the rotor by an amount less than the elastic limit of the coatings and bonding materials. In a radial centrifugal compressor with enclosed radial channels of flow, the air/gas in the channels moves slower and slower with respect to the channel as it reaches higher circumferential Mach speeds, because the channels are larger at larger radii and the air or gas is more compressed at larger radii. This means that the air/gas enclosed in a channel is experiencing low subsonic radial flow with respect to the channel, and the flow will not generate shockwaves inside or tend to wear out the channel. Assuming the gas/air in the compressor is well filtered, the carbon fibers experience little to no friction wear over thousands of start-stop cycles. The SiC also experiences little to no wear over thousands of cycles, since it remains rigidly stationary relative to other parts it touches. The rotor and shaft have negligible relative motion and are the only fast moving parts in the compressor and expander, so achieving longevity in the rotor and shaft will lead toward achieving longevity in the device.

The rotor and shaft form a rigid shape which expands and contracts elastically by small fractions. Rotating slowly on the axis of rotation, the blades sweep out a space called "the blade volume." The blade volume can be enclosed in the axial directions in two parts separated at their outer radius. In embodiments, for example, a plurality of rotor walls can be included with the rotor. In particular, for example, rotor walls comprising two alpha SiC disk annuluses can be centered on the axis, which are rotationally symmetric and reinforced similarly to the blades with PAN carbon fiber, and are part of the rotor. The PAN carbon fiber has more than enough strength to hold the rotor parts with the rim of the rotor moving in the range from about 2000 feet/second up to about 5400 feet/second. The two parts are also referred to herein as rotor walls, or are called "shells," or can be referred to as "the shell" of the rotor.

At this point, the radial compressor and expander are common shapes with unusual construction methods and materials. Alpha SiC is one of several ceramic materials which might be used for the high compression strength material, and may be the better material. Boron Carbide and diamond-like materials could possibly be used in place of SiC. Blades can be formed by stretching carbon fiber around disposable parts surrounding the shaft, which fibers then have extra material added among them, such as carbon, which is transformed into SiC by high temperature reaction with silicon, or castable ceramic, or other materials, to produce a gas tight, stiff, solid, and pre-stressed rotor. The disposable parts are then removed.

An improvement over previous radial compressors is the following. In the rotor the blades stop short of the rim of the shell. Coated PAN carbon fibers are wound circumferentially around the outer edges of the blades, to several layers deep across the blades, and bonded in place to the edges so that at design speed the fibers tend to remain side by side between the blades. This stops the creation of efficiency wasting shock waves and vortexes at the edges of the blades due to pressure differences across each blade, making flow less turbulent in the shell beyond the blades. Flexible blades without pre-stressing or pre-compressing the blade material may also be used.

Another improvement over previous radial compressors is the following: the blades stop short of the rim of the shell. An annular open space lies around the blades. A cylindrical ring of fiber or porous ceramic or metal mesh or channeled material centered on the axis of rotation lies outside said annular open space and fills an annular flow volume inside the shell between two radii, making all rotor flow pass through the porous material. The ring of material does not stop the radial flow, and it does eliminate the turbulence which may arise in the earlier flow. The ring can be a mass of fiber or porous ceramic, or perhaps a metal mesh with radial hexagonal cells, hexagonal channels. It is enclosed on its outer surface by windings of carbon fiber which provide the strength to hold the ring against centrifugal forces, supplement the flow control of the ring and may be considered part of the ring. The ring makes the radial flow passing through it nearly macroscopically uniform and makes the circumferential flow speed closely match the ring where the flow emerges from the ring. The ring accelerates or decelerates the flow as though it were many radial blades in the same volume, so it too experiences circumferential forces. We believe, this has not been done previously in radial centrifugal compressors or expanders. The outer surface of the ring defines the centrifugal Mach speed of the compressor and expander by its surface speed.

In one embodiment, to contain the flow beyond the rotor, the compressor housing or other materials in the housing beyond the rotor radius optionally includes a spiral wall limiting or blocking flow radially which receives the spiraling outward gas/air from the rotor for approximately one revolution leading to an output vent in the housing or other materials in the housing. The wall matches the natural spiral of the gas. The axial direction width of the spiral wall remains constant as the radius increases. The wall, or a portion of the wall, may be fixed at its least radius, and may be repositioned to match different spiral shapes caused by different mass rates of flow.

The same construction techniques may be used and/or mirrored in the radial centripetal expander, and the same geometry can be used in the housing and insulation for input to the expander.

The stationary housing and/or material inside the housing comprises a rotor sealing ring with a surface which mates with the rotor shell outer surface between two radii near the rim of the shell, with a small gap between the surfaces in operation. Next to the gap, the outer surface of the rotating blade shell has optional grooves which are angled to move air/gas toward the rim, and the inner surface of the rotor sealing ring has oppositely angled grooves to move air/gas toward the rim. At high speed, the small gap and the grooves act as a radial pump, which blocks backward flow around the rotor effectively at the Mach speeds of the rotor.

Surfaces, such as the shell, covered by coated carbon fiber can be made smooth by adding metal coating and making the outer surface smooth by common manufacturing techniques such as rolling.

The following describes the compressor outputting supersonic flow. If Mach $M/\sqrt{2}$ is the mach speed of the rotor, the air/gas exiting the rotor and later the output vent has the stagnation temperature of a ramjet in flight at Mach M, Ts K. For example, if the speed of a ramjet engine is Mach 4, the speed of a rotor feeding the ramjet engine is Mach $4/\sqrt{2}$, or Mach 2.828. The compressed air/gas leaving the rotor has enough high energy to replace the air/gas at the same atmospheric conditions around the compressor entering a ramjet engine flying at Mach M. The maximum temperature reached in the rotor, however, is only halfway between $T0$ K and the stagnation temperature, Ts K. The expander can have the same type of construction the compressor has, generally at a larger size, and the maximum temperature reached in the expander rotor is approximately halfway between Tb K, the maximum stagnation temperature in the heating chamber, and exhaust temperature in the atmosphere.

Note that among turbine style engines this embodiment of the invention is the only engine for which no fast moving parts are exposed to temperatures close to the compression temperature or the combustion temperature. The much lower temperatures of the fast moving parts is a key engine design feature because it allows rotor materials to be used which might not survive at the higher temperatures of the combustion region, such as PAN carbon fiber. Embodiments of the invention include a radial centrifugal compressor and expander engine comprising a compressor rotor capable of producing compressed air or gas at the same stagnation temperatures as air or gas entering a flying ramjet engine traveling at Mach M, while the rotor is exposed to a maximum temperature about halfway between $T0$ K and stagnation temperature, Ts K, and comprising an expander rotor capable of receiving compressed air or gas at the same stagnation temperatures as air or gas leaving a flying ramjet engine traveling at Mach M, while the rotor is exposed to a maximum temperature about halfway between Tb K and exhaust temperature.

The housing or materials in the housing and parts on the rotating shaft can be separated by a small gap with grooves on the surfaces pumping air/gas to greater radii. External vacuum pumps can be used to reduce the density of the air/gas in the housing outside the rotor. Tubes can have one end in the housing space outside the rotor and feed into the high Mach speed flow with the tube pointed downstream, which will pull the air/gas in the tube into the main high speed flow, generating only small shockwaves. Without attempting to create a vacuum in the housing, a low density gas such as hydrogen can be fed into the portion of the housing outside the rotor of the compressor, because it will add to the fuel combusted in the ramjet engine, and it will reduce drag on the rotor. These vacuum and drag reducing procedures can add a small percent to efficiency.

The output de Laval nozzle may be truncated to make its exhaust match flow speeds with the input vent speed of the expander where they meet.

This completes the novel design improvements sufficient to supply a stationary ramjet engine with a supersonic flow recreating in the ramjet engine the same internal conditions as Mach M flight.

To supply the ramjet engine with the same stagnation temperature with subsonic flow from a compressor, an annular space in the housing or other materials in the housing surrounds the compressor rotor to a larger radius, which annular space need not extend more than 1.8 times the rotor outer radius from the axis for any Mach speed. Beyond the rotor in the compressor annulus, the circumferential speed of the air/gas slows down inversely proportional to the radial distance from the axis of revolution, also referred to as the axis of rotation. This further compresses the air/gas. The radial speed of the air/gas is low subsonic, on the order of 100 feet/second, and can be controlled by setting the width of the annular space at each radius. Because the spiraling outward air/gas is slowing, it is compressing, such that unless the radial speed becomes excessively slow, the axial gap in the annulus will become smaller with larger radii. As an example, using air as the gas in the compressor, regardless of the rotor Mach speed, before the flow reaches the radius 1.731 times the radius of the rotor, the flow will reach the local speed of sound, which is the actual speed of sound inside the flow. Lower rotor Mach speed flows reach the local speed of sound at smaller radii. Beyond the radius at local speed of sound the flow continues to slow down. When the flow has slowed to design speed it can leave the annular chamber and spiral out to a vent as before. The difficulty of design to avoid creating shockwaves at subsonic speeds is an order of magnitude less than at supersonic speeds. For example, once the flow into the output vent is subsonic, it can be slowed down further by smoothly and gradually increasing the area across the vent in almost any pattern without creating shockwaves; at supersonic speeds it is equivalent to designing square de Laval nozzles. If the flow entering the output vent is locally supersonic, it is a design challenge not to create shockwaves inside the housing.

The compressor outputs subsonic flow and feeds into the front de Laval nozzle, truncated where the flow speeds match. The higher speed portions of the de Laval nozzle are removed, and that includes the choke area of the de Laval nozzle. This has a crucial effect: the input to the ramjet engine has no choke area. The compressor has no choke area because the flow at the speed of sound is not forced through a fixed area. It can spread out radially. This means that there is no choke area to be adjusted on the input side of the ramjet engine, and flow conditions can vary without requiring high speed precise adjustments. Eliminating at least one choke area is one key to making ramjets reliable.

The annular spaces have smooth surfaces next to the flow. The surfaces are added to insulation to block gas/air flow into the insulation, and smoothed. The surfaces may be treated to eliminate large boundary layers from developing in supersonic flow by embedding short fibers in the surface so the fibers stick out of the surface perpendicularly or at a lower angle in the direction of flow. The fibers are separated from other fibers at the surface by one or more diameters. The fibers extend 3 or more diameters above the surface when the Mach speed gas/air blows over them. The fibers are only a few microns thick and are available as smooth cylindrical surfaces with no more than $\frac{1}{30}$ micron variations in diameter, for example, PAN carbon fiber. Boundary layers form on the individual fibers and get wider along the fiber in the direction of flow, but the fiber ends and the boundary layer growth discontinues. The fibers do not present a surface capable of supporting a thick boundary layer.

Small tubes can enter the annular space pointed approximately in the direction of flow, and they can be made flush with the surface. Such a tube will have the air/gas pulled out of it by interaction with the Mach speed flow. The tube can continue through insulation and other materials in the housing and emerge between the housing and a rotor to draw down the pressure next to the rotor. This saves energy by reducing drag on the rotor, which at very high rpm is wasteful. Additionally, an external vacuum pump can be connected to the space around a rotor.

The ramjet engine can continue to output supersonic flow to an expander and/or as a jet through a complete de Laval nozzle.

The same design principles, adding a shaped annular flow region around the rotor, makes the expander capable of receiving subsonic flow into the outer rim of the annulus and converting it to supersonic flow inside the annulus, to match rotor speed at its rim. The subsonic flow is taken from the de Laval nozzle on the rear of the ramjet engine where it matches the expander's design subsonic input speed. That cross-section will be before outflow reaches the choke area in the de Laval nozzle, and the choke area and higher speed portions of the nozzle are bypassed, missing, or removed, eliminating the choke from the ramjet engine output flow. The expander possesses no choke area, for the same reason the compressor possesses no choke area. This allows the designer to eliminate choke areas from output flows not used as jets, which is a key design improvement not found in previous ramjet design.

It is also possible to remove choke areas from flows used as jets, by putting subsonic flow from the ramjet engine into the expander annulus which converts the flow to supersonic and taking supersonic flow from the annulus inner radius and outputting it through the supersonic part of a de Laval nozzle beyond the de Laval choke area. This allows the subsonic to supersonic annulus to replace the choke area of a de Laval nozzle used as a jet.

The elimination of choke areas is an improvement needed to make ramjet engines viable as mechanical output engines for stationary or vehicle power. Paired choke areas require adjustments which are difficult to impossible to control in machinery with changing loads.

The ramjet engine combustion chamber can have more than one output flow. It can retain a de Laval nozzle output, and it can have one or more outputs to expanders. Having additional no-choke outputs allows a de Laval output nozzle to work as a jet without critical adjustments to its choke area. The nozzle choke limits jet output, but the remaining exhaust output goes to the expanders without backing up in the combustion chamber. The expander in an engine can be designed to work on the same shaft as the compressor and drive the compressor when operating and still output power mechanically through its shaft.

The exhaust from the expander can be used for co-generation heating.

Figure 2:
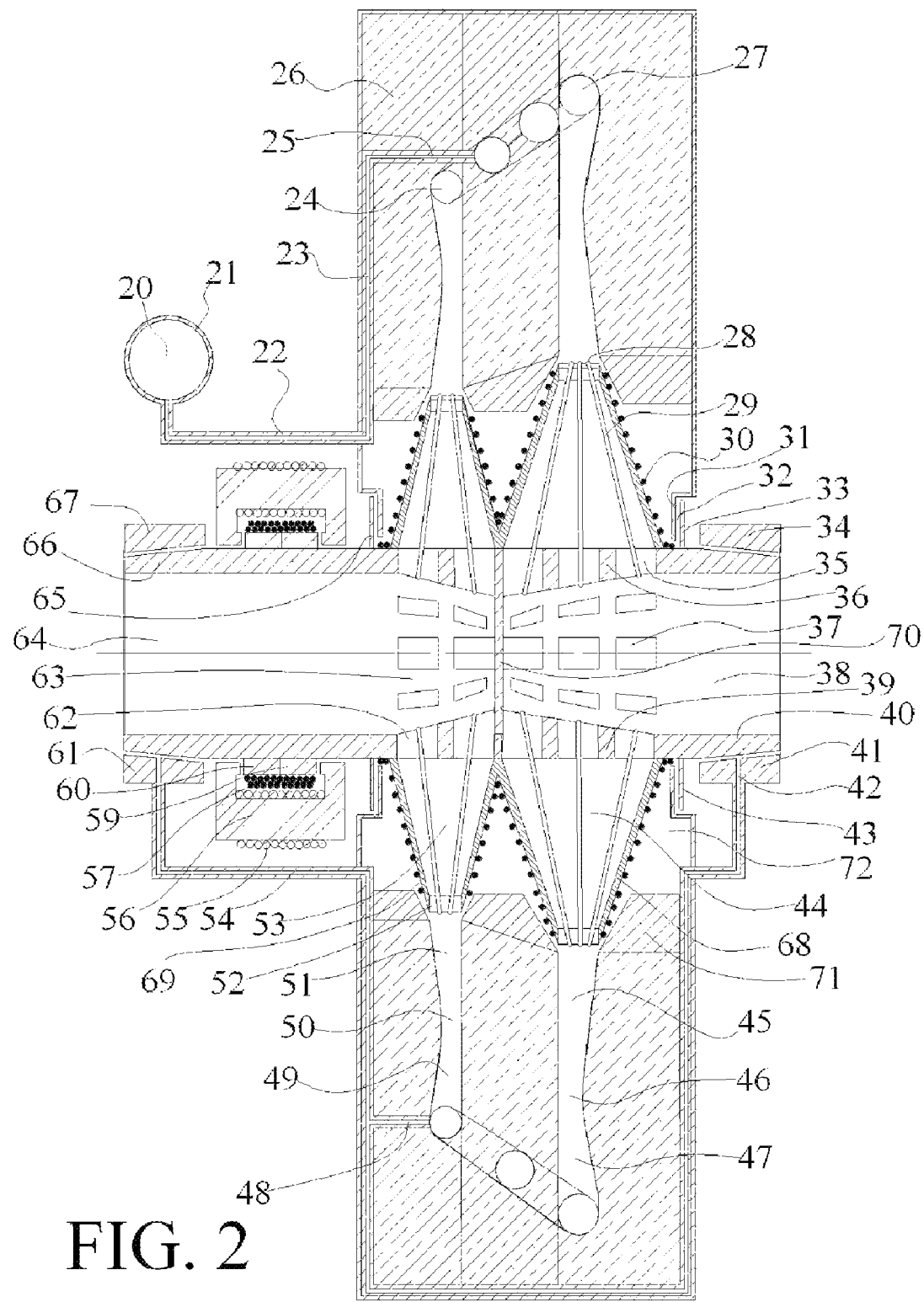
FIG. 2 is a cross-sectional view of an embodiment of an engine, including a compressor, ramjet, and expander in accordance with the invention.

FIG. 2 is a cross-sectional view of an embodiment of an engine, including a compressor, ramjet, and expander. For ease of reference, various points of interest within FIG. 2 are referred to by the terms provided in Table 2.

TABLE 2

| Reference for Points of Interest Labeled in FIG. 2 |
| --- |
| 20. Fuel or steam supply |
| 21. Pressure wall of fuel or steam supply |

TABLE 2-continued

| Reference for Points of Interest Labeled in FIG. 2 |
| --- |
| 22. Fuel or steam tube |
| 23. Heat transfer contact with pressure wall to heat |
| 24. Spiral channel at beginning |
| 25. Fuel or steam inlet line |
| 26. Thermal insulation |
| 27. Exit of spiral flow channel |
| 28. Fiber wrapped on blade outer edge |
| 29. Fiber wrapped on blade |
| 30. Fiber wrapped on shell |
| 31. Pressure vessel wall dynamic seal surface |
| 32. Outward radial flow of dynamic seal |
| 33. Dynamic seal disk |
| 34. Air bearing |
| 35. Exhaust air/gas flow channel |
| 36. Shaft wall between holes |
| 37. Outlet channel in shaft |
| 38. Exhaust route hollow shaft |
| 39. Wall of shaft |
| 40. Shaft in bearing |
| 41. Air bearing |
| 42. Pressurized inlet to air bearing |
| 43. Dynamic seal disk attached to shaft |
| 44. Blade of expander |
| 45. Annulus with supersonic flow to expander rotor |
| 46. Transition region of circumferential flow channel |
| 47. Subsonic flow channel |
| 48. High pressure compressed air outlet |
| 49. Subsonic flow from compressor |
| 50. Transition region supersonic to subsonic flow |
| 51. Supersonic circumferential flow |
| 52. Blade outer edge |
| 53. Blade |
| 54. Compressed air flow tube to bearings |
| 55. Wire wrapping on generator/motor |
| 56. Ferromagnetic plates of generator |
| 57. Carbon fiber winding on generator |
| 58. Not shown in FIG. 2 |
| 59. North pole on permanent magnets |
| 60. South pole on permanent magnets |
| 61. Air bearing |
| 62. Air inflow channel in shaft |
| 63. Bridge in shaft |
| 64. Hollow shaft air inlet |
| 65. Disk of dynamic seal |
| 66. Shaft air bearing |
| 67. Air bearings |
| 68. Expander rotor shell wall |
| 69. Compressor rotor shell wall |
| 70. Inner shaft wall |
| 71. Annular nozzle entrances |
| 72. Annular evacuated region outside of rotating shells |

In FIG. 2, a round titanium shaft 40, 66 centered on the axis of rotation and made of Ti beta-CEZ, or higher strength titanium, is bored out from either end centered on its axis leaving a separating wall 70 and hollow cavities 38, 64. An exemplary material for the shaft can comprise about 5% Aluminum, 2% Chromium, 1% Iron, 4% Molybdenum, 2% Tin, 82% Titanium, and 4% Zirconium. The material may be heat treated to have 220,000 psi yield tensile strength with specific gravity 4.69, hence specific tensile yield strength is 46,908 psi. Radial holes 35, 37, 62 are made through the shaft walls 40, 66 in the expander region and in the compressor region. The compressor 52, 53, 69 is formed on the shaft 66 with SiC blades wrapped with carbon fibers against the shaft and side walls of SiC shells. The SiC blades 53, 44 are compressed to the shaft and over bridges 36 between apertures 35 in the Ti shaft. On the sides of the SiC blades a shell 68, 69 on either side of the blades is placed and carbon fibers are wrapped onto the exterior of the shell. On the outside of the SiC shells carbon fibers 30 are wound around each rotor around the sides and over the rim space between the sides, over the opposite side and back down to the shaft. This wrapping secures the assembly of blades and shells and porous outer ring in place to the shaft. The combination of the shell and the blades and the holes through the shaft form channels which extend radially from the axis of the compressor. Beyond the windings over the compressor blades a porous material or mesh or radial flow directing channels can be placed to make the flow exiting the compressor rotor more uniform and less turbulent. On the shaft spaced slightly away from the compressor to leave room for windings, the expander 44, 68 is similarly structured with larger parts that are wrapped with carbon fibers 28, 29. These blades are compressed onto the shaft 36, and on bridges 39, 63 between apertures 37 through the tension of the carbon fiber wrapping while stationary. On either side of the blades SiC shells 68 are placed radially on the shaft to form radial enclosed channels. On the outside of the SiC shells carbon fibers 30 are wound around the shells over the rotor flow rim entrances, over the opposite side and back down to the shaft. This wrapping secures the assembly of blades and shells to the shaft and confines the porous ring. The combination of the shell and the blades form radial channels around the axis of the expander, also called a diffuser or a de-compressor. On the Ti shaft two dynamic gas seal rings or disk annuluses 33, 43, 65 are placed at the two shaft ports of the pressure housing 31. These two dynamic seal rings due to the high disk speed when the engine is running will entrain gas in the gap between the ring 33 and the housing 31 and drive gas radially outward out of the cavity 32 between the rotors and the housing. This results in reducing drag on the rotors. At either end of the shaft air bearings 34, 41, 61, 67 are placed. The high pressure air flow 42 to operate the air bearings initially can come from a pressure bottle reservoir or air pump. When in operation the high pressure gas supply for the air bearings can come from drawing a pressurized gas 48, 54 off the compressed gas flow. These high pressure gas lines can run along the inner surface of the pressure tank 31 and outside the thermal insulation 26 within the pressure tank. The adiabatically compressed gas 48 from the compressor is hot so by running them along the wall toward the center axis, which is cooler the high pressure gas can be cooled down by heat exchange with the entering fuel 20 and exterior pressure vessel 21 before it goes into the air bearings 34, 61. The air bearings are cone shaped to hold the rotating shaft axially. Along the shaft an electromagnetic dynamo 55, 56, 57, 59 is shown which can be used to start up the engine if pulsed electrical current is added to the electromagnets of the dynamo 56. Once the engine is running the dynamo is used to extract pulsed electrical energy from the engine. The dynamo consists of permanent magnets 59, 60 wrapped with high strength carbon fiber to the Ti shaft. The magnetic field circuit is completed by going in to ferromagnetic core-plate stators 56 that are wrapped with copper coils 55. When the shaft is rotated the magnetic field changes intensity and polarity, producing electrical pulses in the copper coils 55. A useful version of this engine can operate at rates of 150,000 revolutions per minute, thus producing high frequency alternating current output. This high frequency alternating current output may be expected to be converted to DC current then from DC and back into a frequency matching applications or matching electrical grids. These conditioning electronics are not shown. Outside of the radial compressor and radial expander, annular channels 45, 46, 47, 49, 50, 51 are formed to accept the outward spiraling radial flow off the compressor and to deliver the inward spiraling radial flow to the expander. On either side of the exit for the compressor rotor and entrance of the radial channels for the de-compressor, rotor sealing rings 71 made of SiC or metal, such as 304 stainless steel, or dense ceramic material are formed to define the entrance/exit to/from the annular supersonic transition regions. During design rpm, the rotor sealing rings are designed to maintain a close gap with the sides of the rotors near the rim. This gap between the rotors and the annular nozzle entrances creates a vacuum pump by entraining gas to flow out of the cavity into the annular flow cavities at larger radius. By evacuating the gas cavity 72 between the rotors and the surrounding stationary components the drag on the rotor is reduced. In this embodiment of the engine outside the compressor rotor an annular sonic converter cavity, which is a volume of revolution around the axis of rotation, is formed with walls of refractory metals or ceramics such as shaped molybdenum tubing or silica foam, such as Cotronics M310, and uses radial profile shapes such as those recommended in FIGS. 7, 8 and 9 (explained in more detail below), or other profiles, for the circumferential flow transitions from supersonic to subsonic flow, while defining the pattern of radial flow. Within the annular cavity the flow enters from the porous ring or empty annular space around the blades of the compressor at supersonic velocity 51, slows 50 to local speed of sound and then at larger radii the flow is further subsonic 49. Once the annular flow is in the subsonic region the flow profile can be changed 24 gradually without inducing shockwaves and slowed, which converts the kinetic energy of the flow to high temperature and pressure in the flow. The expected compression temperatures are around 1200 K, or 927° C., at pressures around 128 atmospheres, to around 1500 K at pressures around 279 atmospheres. The outer radius of the annular chamber occurs at the first point contracting the outer wall blocking radial flow. Beyond the outer radius of the annular sonic transition converter a final revolution with constant axial width leads to an exit vent 24, 27 which connects to a spiral tube in the insulation which may be formed of gas tight materials such as quartz and leads from the compressor 24 to the expander 27 where another vent feeds the annular region in one spiral flow revolution. Within this spiraling tube, which is the combustion chamber, heat can be added by various means to the gas stream, but frequently by adding fuel through a fuel line 22 to the high pressure and high temperature air and burning it. The fuel line 23, 25 can be used to scavenge heat from the pressure vessel walls and to heat and optionally vaporize the fuel. Other methods of adding heat to the gas stream in the combustion chamber are: radiant heating such as solar, heat exchange by circulating a hotter fluid through pipes to heat the air/gas, hot material injected into the flow such as very high temperature steam, particle reactions in the chamber with high energy particles from a particle generator, and other ways.

Figure 3:
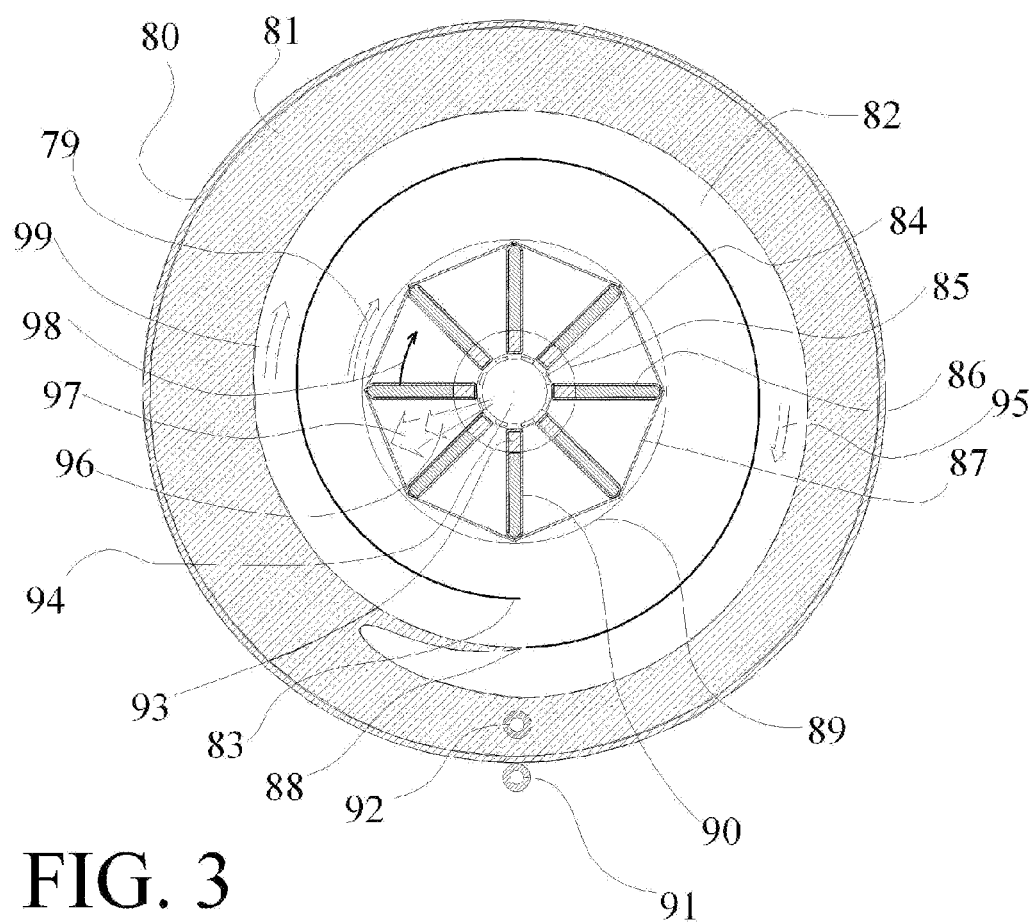
FIG. 3 provides an example of an embodiment of a compressor according to the invention, showing a cross-sectional view taken perpendicular to the axis of rotation of the rotor and through the rotor blades.

FIG. 3 is a cross-sectional view of one embodiment of a compressor, with the cross-section in a plane perpendicular to the axis of rotation of the rotor. For ease of reference, various points of interest within FIG. 3 are referred to by the terms provided in Table 3.

TABLE 3

Reference for Points of Interest Labeled in FIG. 3

79. Supersonic circumferential flow
80. Pressure vessel wall
81. Thermal insulation TABLE 3-continued Reference for Points of Interest Labeled in FIG. 3

82. Edge of annulus
83. Outward spiral to vent beyond annulus
84. Flow apertures in shaft ID
85. Shaft of compressor
86. Blade
87. Carbon fiber circumferential wrapping on blades
88. Circumferential flow channel transitioning to exit tube
89. Compressor rotor shell outer radius
90. Radial wrapping on blade
91. Compressed gas to the air bearings
92. Fuel and/or steam tube
93. Bridge between holes in shaft
94. Hollow of shaft
95. Slowing subsonic spiral flow
96. Radial flow though shaft wall aperture
97. Radial flow in radial channel of rotor
98. Rotation direction of radial compressor
99. Locally subsonic circumferential flow at large radius In FIG. 3 a view along the axis shows the blades 86 of a compressor in a cross section perpendicular to the axis. The flow in the rotor 97 is radial relative to the rotor, but the circumferential speed 79 is much higher than the radial flow. The housing 80 contains thermal insulation 81, and hidden inside the insulation are the tubes 82 of the combustion chamber spiraling to the expander. The edge of the annulus 88 lies next to one revolution of spiraling outward 83 subsonic flow 95, 99 transitioning 88 to the exit vent, shown only in cross section. Air/gas flow enters the rotor through the shaft 85 bore 94, as in FIG. 2. It flows 96 through tunnels or holes 84 through the shaft wall into the rotor interior where the flow slows down 97 because of compression and greater flow area. The blades have edges on the shaft 93 between the holes 84. At the outer edge of the blades there is a circumferential high pressure winding shown as straight lines 87. Radial windings 90 also put pressure on the blades. The shells are not shown but their outer radius 89 is shown. The direction of rotation 98 of the rotor is shown. Also shown is a tube 91 supplying compressed air to the air bearings. Also shown is the tube 92 supplying fuel or steam to the combustion chamber.

Figure 4:
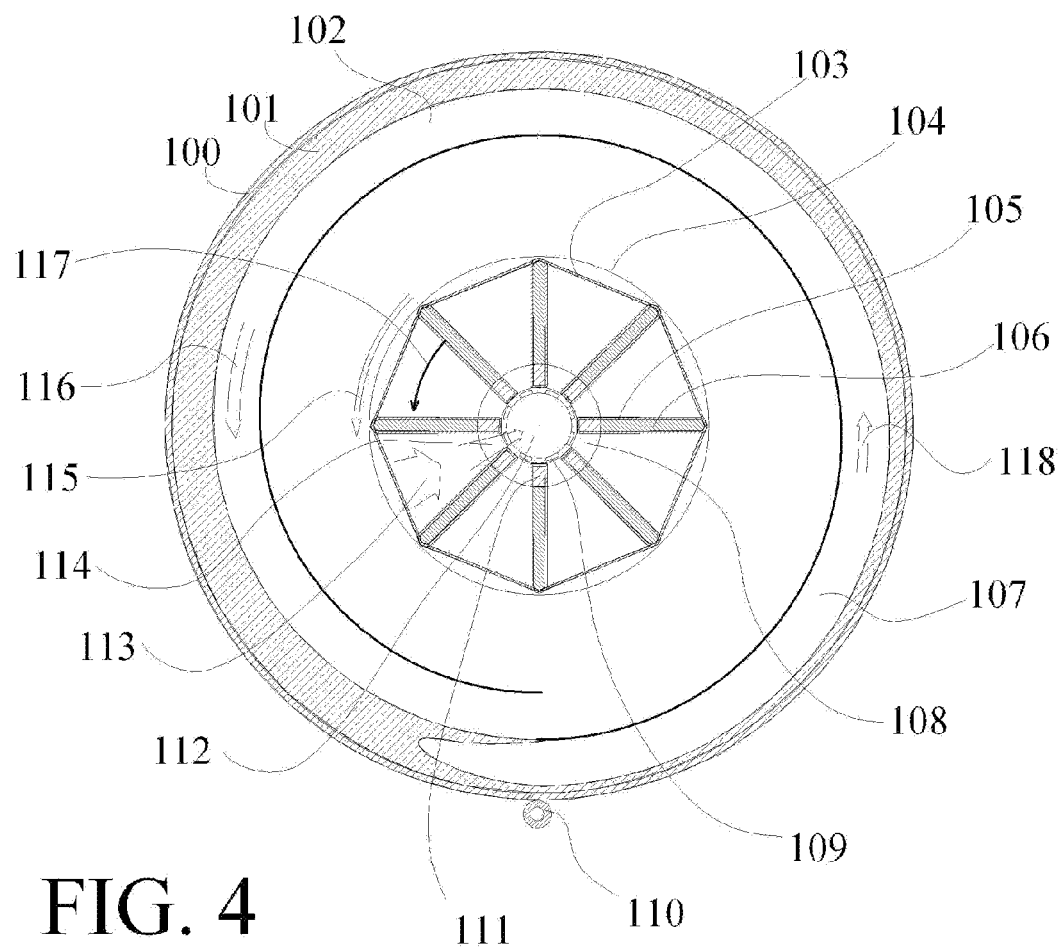
FIG. 4 provides an example of an embodiment of an expander according to the invention, showing a cross-sectional view taken perpendicular to the axis of rotation of the rotor and through the rotor blades.

FIG. 4 is a cross-sectional view of one embodiment of an expander, with the cross-section in a plane perpendicular to the axis of rotation of the rotor. For ease of reference, various points of interest within FIG. 4 are referred to by the terms provided in Table 4.

TABLE 4

Reference for Points of Interest Labeled in FIG. 4

100. Pressure vessel wall
101. Thermal insulation
102. Spiral shape outside annulus
103. Carbon fiber circumferential wrap on blades
104. Rotor shell outer radius
105. Carbon fiber radial wrapping on blade
106. Blade
107. Spiral flow vent entrance
108. Flow channel through shaft wall
109. Aperture in shaft ID
110. Compressed air/gas to the air bearings
111. Bridge between holes in shaft
112. Hollow shaft bore
113. Radial flow in channel between blades
114. Radial flow through shaft aperture
115. Supersonic circumferential flow
116. Subsonic circumferential flow TABLE 4-continued Reference for Points of Interest Labeled in FIG. 4

117. Rotation direction of blades and rotor
118. Subsonic spiral flow entering annulus In FIG. 4 the expander or de-compressor is shown. It is larger than the compressor in FIG. 3 and operates in reverse flow 113. Blades 106 surround shaft 111 and are pressed to the shaft by radial windings 105 which go through channels 108 for air/gas flow into the bore of the shaft 112. A circumferential carbon fiber winding 103 also presses the blades on the shaft toward the axis of the shaft, and keeps shockwaves and vortices from appearing at the outer edges of blades. The blades are enclosed in a rotor shell or shells on both sides whose outer radius 104 is larger than the blades radii. Air/gas enters the spiral shape circuit 102 with subsonic flow 118 through a vent emerging 107 from the thermal insulation 101. The flow spiral is shown by a heavy line, the flow enters the outer radius of the annular region in one circuit around the axis. The flow remains subsonic 116 outside the annulus, but speeds up with smaller radii until it reaches supersonic speed 115. The rotation of the blades 117 matches the circumferential speed of the air/gas 115 at the edge of the rotor 104. The flow 113 in the rotor is almost purely radial with respect to the rotor chambers and goes from slowest at largest radius to fastest at smallest radius 114 and enters the shaft hollow 112. The rotational speed 117 is proportional to radius, so the blades are slowing the supersonic speed 115 to subsonic or near subsonic in the shaft. Every portion of the rotor which limits circumferential speed, from the outer porous ring (not shown) to the channels in the shaft 108 does the job of blades by slowing down the circumferential speed of the flow. That deceleration produces forces on all bladelike parts in the direction of rotation, all of which is conveyed to the shaft through the high tension windings that reach the shaft. The pressure vessel or housing 100 touches the tube 110 which carries compressed air for the air bearings. Apertures 109 on the inner surface of the shaft are shown.

Figure 5:
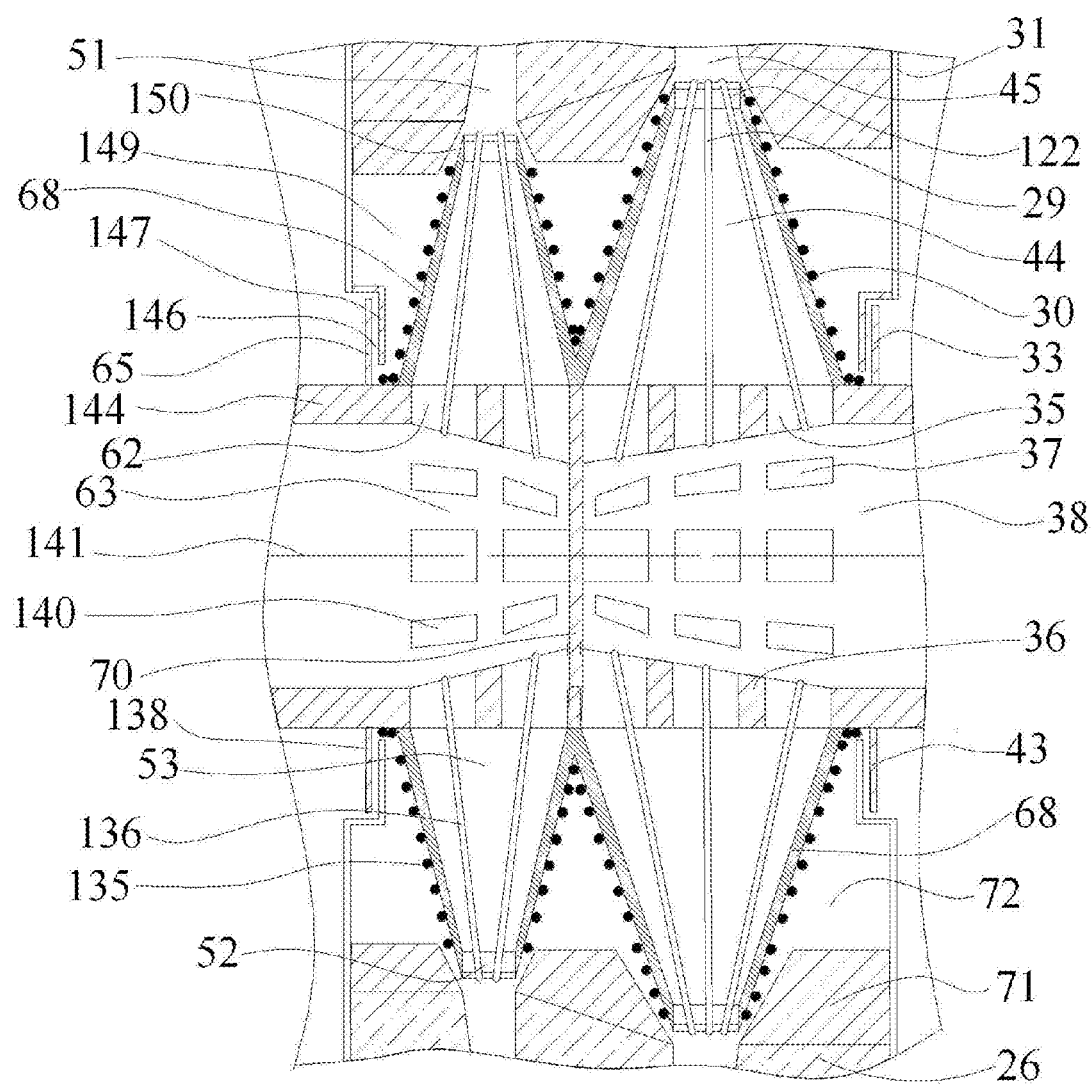
FIG. 5 is an enlarged cross-sectional view of the compressor and expander regions of an engine embodiment as shown in FIG. 2, with the cross-section in a plane perpendicular to the axis of rotation of the rotor, and enlarged to show details of the dynamic seals.

FIG. 5 is an enlarged cross-sectional view of a compressor and expander, with the cross-section in a plane containing the axis of rotation of the rotor, and enlarged to show details of the dynamic seals. For ease of reference, various points of interest within FIG. 5 are referred to by the terms provided in Table 5.

TABLE 5

Reference for Points of Interest Labeled in FIG. 5

31. Pressure vessel wall
45. Supersonic channel outlet
122. Blade tip of expander
29. Radial wound carbon fiber on blade
44. Blade
30. Carbon fiber wrapping on rotor shell
33. Disk dynamic seal expander side
35. Channel in shaft exhaust flow
37. Aperture in shaft ID for exhaust flow
38. Hollow shaft exhaust
36. Wall in shaft between channels
43. Disk of dynamic seal (expander side)
68. Rotor shell
26. Thermal insulation
52. Blade outer edge
135. Carbon fiber winding on rotor shell
136. Radial carbon fiber winding on blade
53. Blade on compressor side
138. Disk dynamic seal (compressor side)

TABLE 5-continued

Reference for Points of Interest Labeled in FIG. 5

70. Wall in shaft
140. Aperture in shaft to compressor
141. Axis of shaft
63. Bridge in shaft
62. Flow channel in shaft
144. Shaft wall
65. Dynamic disk seal (compressor side)
146. Flow channel in dynamic seal
147. Pressure vessel wall in dynamic seal
149. Annulus between housing and shell (compressor side)
150. Narrowing channel
51. Supersonic flow annulus of compressor (compressor side)
71. Rotor sealing ring (annular nozzle entrance)
72. Annulus between housing and shell (expander side)

In FIG. 5 an enlarged cross-sectional view of the compressor and expander with the dynamic seals is shown with the cross-section along the shaft axis of the engine. The drawing is symmetric and mass rotating components are balanced about the shaft axis 141 of the engine. The shaft of the engine has two hollow cylindrical cavities 38, 63 formed in the high strength material 144, such as titanium. Channel 62 in the shaft 144 for inlet air/gas flow which travels radially near the compressor blades 53, and channel 35 for outlet exhaust which leaves through the end of the shaft 38 and are formed in the shaft 144. The remaining material between the apertures 140 forms bridges 63 of material against which the compressor components of blades 53 and shells 68 are pressed. Near the center of the shaft between the inlet cavity and the outlet cavity a wall 70 of the shaft is formed to separate the inlet and outlet flows. On the outlet side of the shaft the hollow cavity 38 has an outlet bore and there are channels 35 and apertures 37 similar to the inlet side with a greater cross-sectional area to the flow to accommodate the higher gas flow volume from the exit of the expander/de-compressor. On either side of the rotor assemblies (compressor and de-compressor) 122, 44, 30, 68 are dynamic seals 33, 43, 138, 65, 146, 147. These dynamic seals consist of one or more disk annuluses 65 attached to the shaft 144 and then adjacent to one side of each disk annulus 65 is the non-moving or much slower moving pressure vessel wall disk annulus 147. In operation when the shaft 144 is rotating gas is entrained by the disk annulus 65 on both sides and by centripetal acceleration is driven to the outer radius of the disk 65 and exits outside of the pressure vessel wall 147. Pumping action and dynamic sealing is achieved by the side of the disk with a small clearance gap 146 near the pressure vessel wall disk 147 which does not allow exterior gas to enter the pressure vessel 31 and flow back against the entrained gas in the gap 146. While on the outside of the disk 65 the gas will be allowed to circulate and stay at the pressure of the surroundings. Thus, the dynamic seals will draw gas out of the space 149, 72 around the rotors 68 and prevent gas flowing into this space thereby reducing the gas drag on the exterior of the rotors.

In this figure the rotors of the compressor 53, 68 and the de-compressor 44, 68 are shown with carbon fiber wrappings or windings 29, 30, 135, 136 to hold the shells 68 and blades 44, 53 against the shaft 144 and against the centripetal forces on the these components. The blades are formed out of a material with a high specific compressive strength, at the operating temperature of the gas flow in the engine. Additional flexible blades may be formed primarily out of fiber tow with coatings. Examples of suitable materials are Alpha Silicon Carbide, Boron Carbide, and Aluminum Oxide to name a few. For example, Hexoloy SA may be used as the structural compression material with compressive strength 560,000 psi and specific gravity 3.1, and hence specific compressive strength of 180,645 psi. Hexoloy SA can be obtained from Saint-Gobain Ceramics Structural Ceramics of Niagara Falls, N.Y. The blades and shells form radial cavities subdividing the blade volume out from the shaft. Carbon fibers or other high strength fibers such as glass fibers, are wound around the blade tip 52 and back down to the shaft and/or through the shaft with the base of the blades pressed against the shaft and bridges 36, 63 in the shaft between the apertures. The carbon fiber windings are done with tension on the fibers as they are wound and are secured to the shaft with high temperature epoxies, silicon/SiC reactions, metal brazing, or frictional mechanical clamping the end of the fiber tows. The carbon fibers may have coatings on them to give them higher abrasion resistance, oxidation resistance, corrosion resistance and allow for brazing or chemical reactions to secure or fuse the surfaces of the fibers together. Possible suitable coatings are $B_2O_3$, nickel plating, SiC, $SiO_2$, ZrC, $ZrB_2$, $Si_3N_4$, $HfB_2$, and $HfB_2$ mixed with SiC. The exterior coating on the fiber could be formed such that it would form a layer over the fiber able to stretch elastically over the range that they are used in the engine. On the two sides of the rotors, compressor, and expander, enclosing shells 68 or disks are formed from high specific compressive strength material such as alpha silicon carbide. These shells are used to hold the flowing gas in the cavities between the blades and separate the blades from the stationary evacuated cavity 72, 149. At the high rotor velocities of this invention gas shear interactions of open blades with the stationary walls can create significant drag. The shells are secured to the sides of the blades with carbon windings around the shells and the shaft. It is possible that the shells could be formed with indexing grooves or ridges to position the blades evenly about the shaft. Beyond the blade 44 tips a porous or channeled material 122 covers the rim of the circular cavity around the blades. This porous or channeled material absorbs turbulence and establishes more uniform radial flow out through the channels between the blades. The porous ring acts on the air/gas as a large number of blades. Carbon or high strength fibers are wrapped around the rim of the porous rim material to retain it against the high centrifugal forces when the compressor and de-compressor are rotating. Radially beyond the tips of the compressor a rotor sealing ring 71 of a high strength refractory material such as 304 stainless steel, tantalum, molybdenum, fused silica, alumina, and glazed foamed silicon dioxide define the entrance to the annular supersonic 51 to subsonic flow transition flow region in the engine. The aperture or rotor sealing ring and the shell have a narrow gap 150 between them which pumps air/gas to larger radii. The larger annular region of the annular flow region can be formed with a smooth surface of castable ceramic or fused glass or metals such as molybdenum. Backing this smoother annular rotor sealing ring is thermally insulating fused, silicon dioxide 26 or other rigid insulation. Radially beyond the tips of the de-compressor rotor the annular subsonic to supersonic conversion annular flow region 45 is defined with the same or similar high strength refractory materials as used around the compressor. In both the compressor and de-compressor cases the annular disks 43 may need to hold and seal against the pressure vessel walls the pressure difference of low pressure around the rotors 72 to the atmospheric pressure outside the housing. The rings 71 near the rim of the rotors and the small gap between them and the rotors 68 and windings 30 act to pump air/gas from the annular space 72 to larger radii where the pressure around the rotor rim may be 24 atmospheres or higher.

Figure 6:
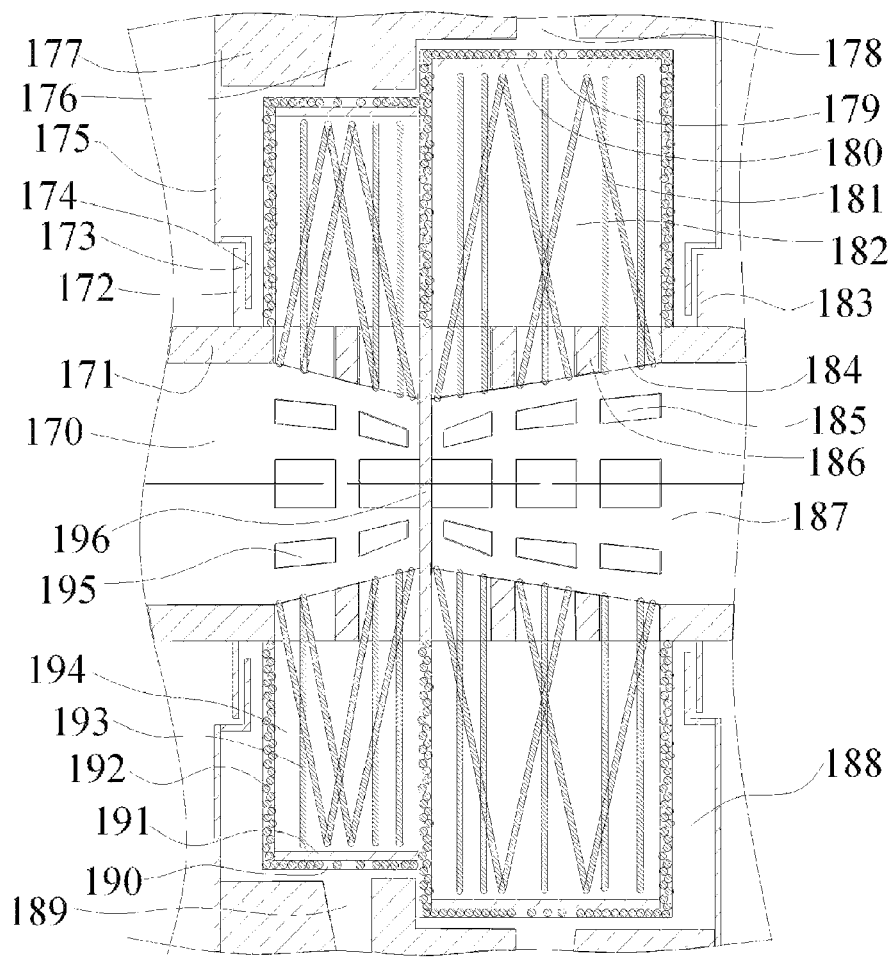
FIG. 6 is an enlarged cross-sectional view of one inventive embodiment of a compressor and expander, with the cross-section in a plane perpendicular to the axis of rotation of the rotor, and enlarged to show details of alternate blade and channel structures.

FIG. 6 is an enlarged cross-sectional view of an embodiment of a compressor and expander, with the cross-section in a plane containing the axis of rotation of the rotor, and enlarged to show details of alternate blade and channel structures. For ease of reference, various points of interest within FIG. 6 are referred to by the terms provided in Table 6.

TABLE 6

Reference for Points of Interest Labeled in FIG. 6

Figure 10:
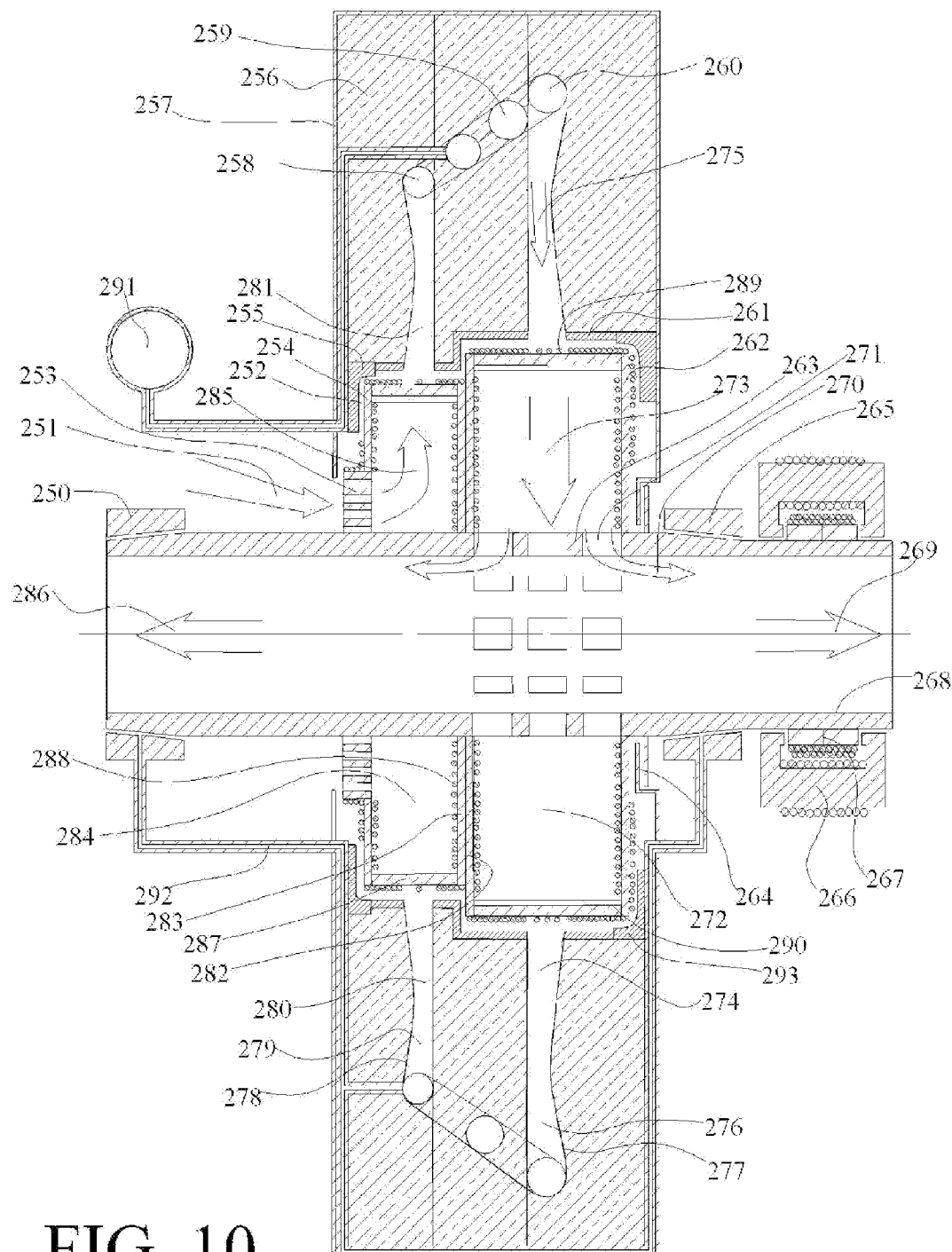
FIG. 10 is an enlarged cross-sectional view of one embodiment of a compressor and expander in accordance with the invention, with the cross-section in a plane perpendicular to the axis of rotation of the rotor, enlarged to show details of the input flow and hollow shaft output flow, a configuration capable of doubling power at a small efficiency cost.

170. Shaft bore
171. Shaft wall
172. Disk on shaft dynamic seal
173. Flow channel in dynamic seal
174. Housing wall in dynamic seal
175. Pressure vessel
176. Supersonic annulus for compressor
177. Insulation
178. Supersonic annulus for expander
179. Inflow area for expander
180. Porous ring at expander rotor edge
181. Carbon fiber in or on blade
182. Filler material in blade
183. Dynamic seal disk on shaft
184. Channel through shaft
185. Aperture in shaft ID
186. Shaft wall between channels
187. Exhaust in hollow shaft
188. Low pressure annulus outside rotor
189. Spiral outward flow from compressor
190. Annular flow area from compressor rotor
191. Porous ring at rotor edge
192. Rotor shell made of carbon fiber and filler
193. Carbon fiber of blade
194. Filler of blade
195. Aperture in hollow shaft for air/gas
196. Wall separating inflow from outflow In FIG. 6 an enlarged view of the compressor rotor 190, 191, 192, 193, 194 and expander rotor 179, 180, 181, 182 are shown with alternate blade 181, 182, 193, 194 and channel 184 structures. In this figure the alternate construction of blades directly from carbon fiber with coatings and optional stiffening and/or hardening materials is shown. The components of the hollow 170 shaft 171, flow apertures 184, 195, and dynamic seals 172, 173, 174 to the pressure vessel 175 are shown as duplicates of what was described in FIG. 5. The annular supersonic 176 to subsonic flow annular cavity for the compressor and subsonic to supersonic flow 178 cavity for the de-compressor are duplicates of what was described in FIG. 5, including insulation 177, apertures 185, the hollow shaft 187, the low pressure annulus 188, the spiraling outward flow in the compressor annulus 189, and the region separating wall 196 in the bore. The blades in this alternate embodiment of the invention are formed by hanging tow of carbon in loops or as brushes, or as fiber wound around a stretched tow perimeter possibly pre-stressed and coated, from the shaft its apertures and bridges and other rotor parts. The carbon fibers are secured to the shaft by tying, by high temperature epoxies, brazing, or surface interaction with the shaft. The hanging fibers can be wound onto the shaft. Other possible fiber securing mechanisms are to mechanically clamp, wind, or weave fibers over the hanging fibers. Carbon fibers 181, 193 could be woven into a structure that mimics a basket in the desired blades, radial gas flow channels 183, 194 and side walls 192 to the gas flow channels. Stiffening material could be infiltrated within this woven structure such as silicon carbide by chemical reactions or vapor deposition or sputtering, or castable ceramics can be forced between the fibers. At the rim of the radial gas flow channels a porous or radially channeled ring 180, 191 is placed and formed out of fair specific compressive strength material, stiff against finger pressure or more. Suitable materials for this ring are fused silicon dioxide foam, carbon fiber networks, carbon fiber networks that have been reacted with silicon to form SiC coating on the fibers and bonding between the fibers. The carbon fiber winding is arranged such that radial exits 179, 190 for air/gas flow are distributed at the center of the rim of the compressor and de-compressor rotors, or the porous rings outer surface can be sealed everywhere except near flow apertures 176, 178, 189. Circumferentially accelerated gas flow incident on the compressor blades, that are made radially rigid by the centrifugal forces of rotation, will flow through these apertures and enter the annular region of the supersonic to subsonic transition region 176. On the de-compressor side the supersonic radial inflow will impinge and flow through the apertures between the fiber windings 192 and the partially sealed porous 180, 191 or channeled ring material. The in spiraling radial flow 178 in the de-compressor will decelerate against the ring and against the carbon fiber blades that are held out by the centrifugal forces of rotation and deliver rotational energy to the de-compressor. The mechanical energy from the de-compressor will be transmitted though the shaft 171, 186 to the compressor and as mechanical rotational energy to dynamos as shown in FIG. 2 or FIG. 10, or to other applications. On either side of the compressor and de-compressor blades are shells 192 of wound carbon fibers that are bonded together by high temperature bonding material, SiC or by their protective coatings. These shells form gas tight barriers to side flow out of the radial gas flow channels 182, 194 formed by the blades. Carbon fibers 192 are wound from the shaft to up over the edges of the disks to secure the disks to the shaft and pull the disks to the rigid blades of the compressor and de-compressor.

Figure 7:
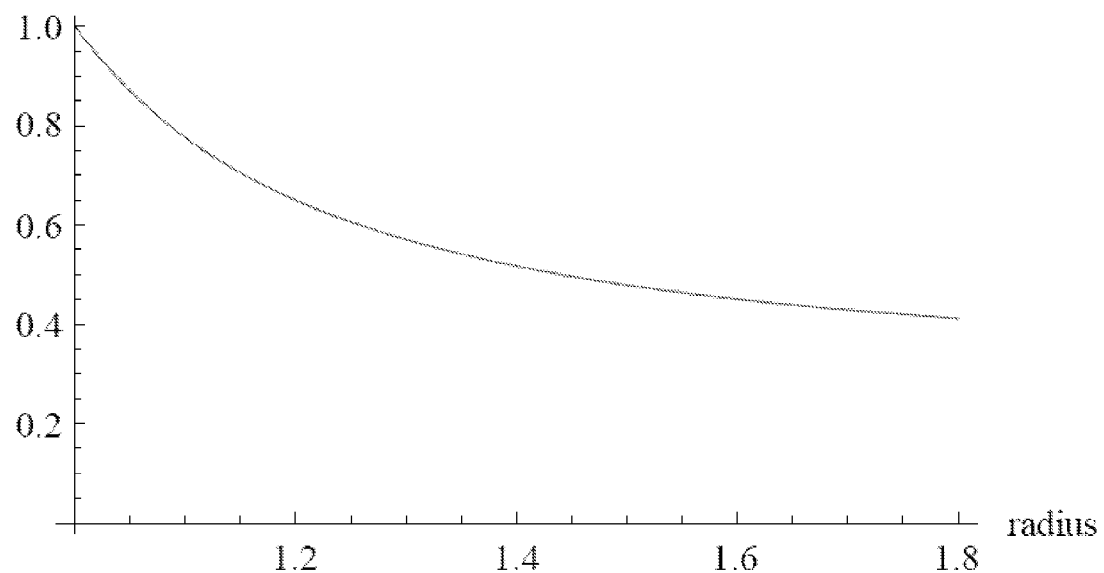
FIG. 7 is a graph showing an annular flow spiral chamber gap profile with radius to achieve radial flow speed proportional to the inverse of the radius of the spiral chamber.

FIG. 7 is a graph showing an annular flow spiral chamber gap profile with radius to achieve radial flow speed proportional to the inverse of the radius of the annular spiral chamber. In FIG. 7 the annular flow cavity axial width for the radius is shown to achieve radial flow inversely proportional to the radius in the annular cavity. The horizontal axis of the plot is the radius referenced from the axis of the shaft with the radius of the rotor set to one and with the gap set to one at the edge of the rotor. This profile was calculated assuming an ideal isentropic supersonic/subsonic flow with the ratio 7/5 of constant pressure heat capacity to constant volume heat capacity of the gas and moderate subsonic radial flow speeds.

Figure 8:
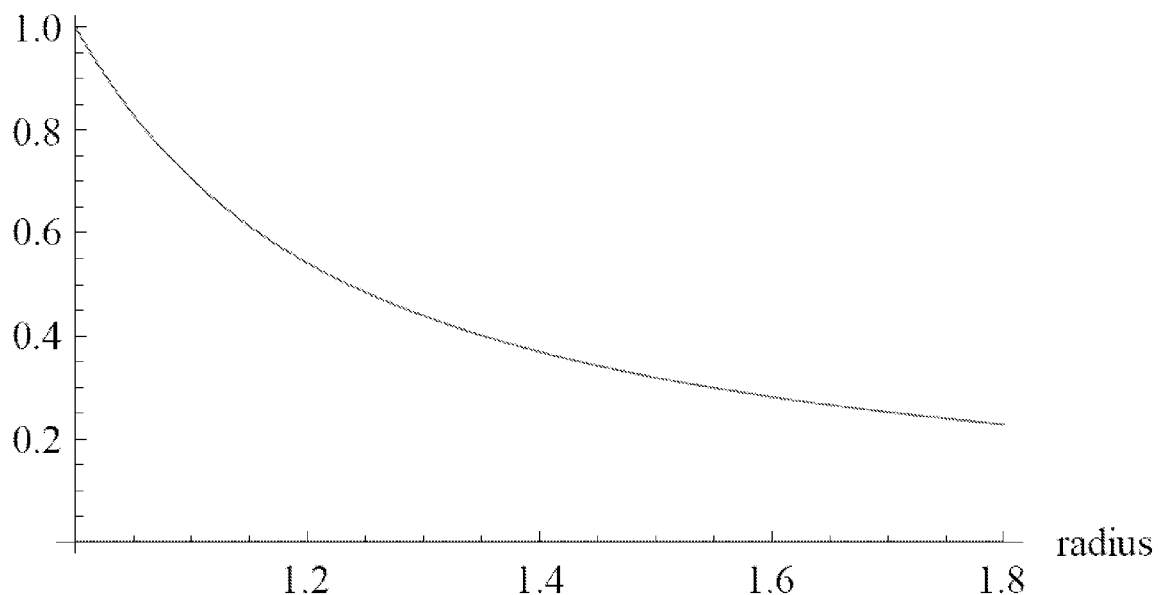
FIG. 8 is a graph showing an annular flow spiral chamber gap profile with radius to achieve radial flow speed being constant with the radius of the spiral chamber.

FIG. 8 is a graph showing an annular flow spiral chamber gap profile with radius to achieve radial flow speed being constant with the radius of the annular spiral chamber. In FIG. 8 the annular flow cavity axial width for the radius is shown to achieve constant moderate subsonic radial flow throughout the annular cavity. The horizontal axis of the plot is the radius referenced from the axis of the shaft with the radius in the rotor set to one and with the gap set to one at the edge of the rotor. This profile was calculated assuming an ideal isentropic supersonic/subsonic flow with the ratio 7/5 of constant pressure heat capacity to constant volume heat capacity of the gas.

Figure 9:
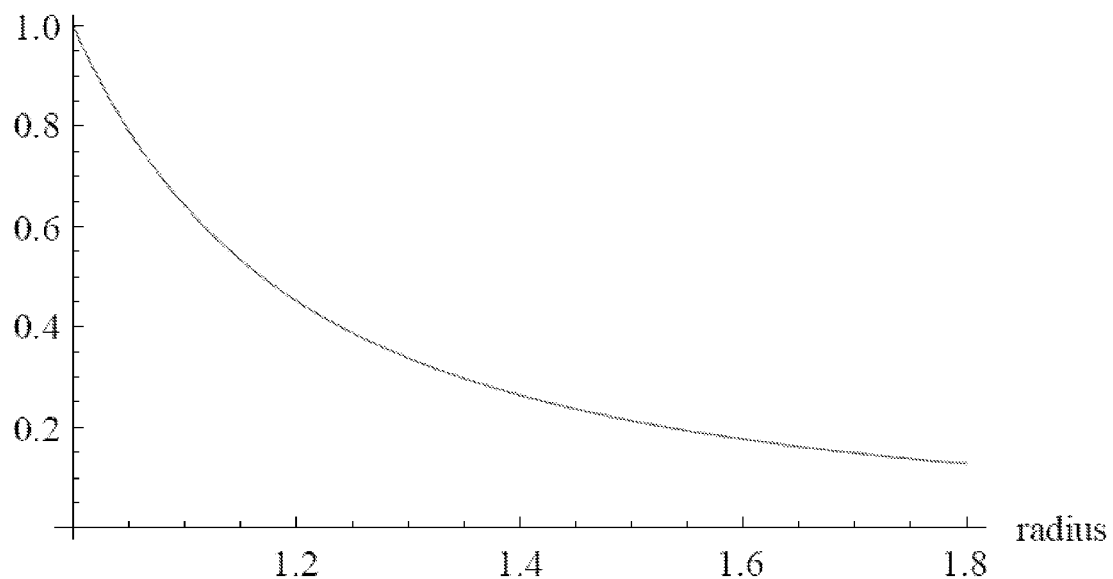
FIG. 9 is a graph showing an annular flow spiral chamber gap profile with radius to achieve radial flow speed proportional to the radius of the spiral chamber.

FIG. 9 is a graph showing an annular flow spiral chamber gap profile with radius to achieve radial flow speed proportional to the radius of the annular spiral chamber. In FIG. 9 the annular flow cavity axial width for the radius is shown to achieve moderate subsonic radial flow proportional to the radius in the annular cavity. The horizontal axis of the plot is the radius referenced from the axis of the shaft with the radius of the rotor set to one and with the gap set to one at the edge of the rotor. This profile was calculated assuming an ideal isentropic supersonic/subsonic flow with the ratio 7/5 of constant pressure heat capacity to constant volume heat capacity of the gas.

FIG. 10 is an enlarged cross-sectional view of an embodiment of a compressor and expander, with the cross-section in a plane containing the axis of rotation of the rotor, enlarged to show details of the input flow and hollow shaft output flow, a configuration capable of doubling power at a small efficiency cost. For ease of reference, various points of interest within FIG. 10 are referred to by the terms provided in Table 7.

TABLE 7

Reference for Points of Interest Labeled in FIG. 10

250. Air bearing
251. Air/gas inflow
252. Gap between pressure vessel and rotor
253. Material adding rotation to air/gas before reaching blade
254. Rotor shell
255. Rotor sealing ring
256. Thermal insulation
257. Pressure vessel wall
258. Spiraling gas toward vent
259. Heat addition region to gas channel
260. Hot gas vent to expander
261. Wall clearance material
262. Rotor shell on expander
263. Wall between holes in shaft
264. Wall clearance and evacuated region and dynamic gas seal
265. Air bearing
266. Ferromagnetic core and copper coils
267. Permanent magnet wrapped to shaft
268. Shaft
269. Exhaust flow in hollow of shaft
270. Exhaust gas flow
271. Exhaust gas flow through shaft hole
272. Blade
273. Radial flow over blade
274. Supersonic flow to blade in annular cavity
275. Transition from subsonic to supersonic flow
276. Subsonic flow in annulus
277. Annulus cavity wall
278. Compressor's annular cavity wall
279. Subsonic flow in annular cavity
280. Subsonic to supersonic transition
281. Supersonic flow
282. Radial disk walls - shells
283. Radial disk walls - shells
284. Blade of compressor
285. Radial flow relative to blade
286. Exhaust gas flow
287. Porous ring with flow channels
288. Carbon fiber wrapping
289. Carbon fiber wrapping
290. Porous ring with flow channels
291. Fuel source
292. Air/gas line
293. Rotor sealing ring In FIG. 10 a typical embodiment of this invention is illustrated as a cross-sectional view containing the axis of the engine. A round titanium shaft 268 centered on the axis of rotation and made of Ti beta-CEZ, or higher strength titanium, or a high tensile strength fiber/metal or fiber/polymer composite, has a hollow centered on its axis leaving a thick wall. The shaft material mentioned with respect to FIG. 2 above may also be used for the shaft of FIG. 10. Radial holes 263, 271 are made through the shaft wall 268, 271 in the expander region 272 and not into the compressor region. The hollow, sometimes called a bore or an inner diameter, goes all the way through the shaft. The compressor 284 and expander 272 regions outside the shaft are separated by a radial annular alpha SiC disk 282, 283 perpendicular to the shaft which reaches beyond the outer radius of the expander blades 272, and said disk 262, 254, 282, 283 is compressed toward the shaft by windings 288, 289 and forms one side of both rotors. The opposite side of the expander rotor is a same size SiC annular disk 262 starting at the shaft. The blades, disks, and shells can be made primarily of stretched carbon fiber which is infiltrated by materials that coat, stiffen and harden the fibers making them rigid forms which are gas tight. Blades can also be flexible fiber which is tied to the shaft and other rotor parts.

The opposite side of the compressor rotor 253, 254, 283, 284, 287, 288 is a SiC annular disk 254 centered on the axis but starting at a distance beyond the surface of the shaft and continuing to a radius greater than the compressor blades' 284 outer radius. The annular disks are wound individually with carbon fiber. The SiC blades 284, 272 cross the space between the disks bounding the flow regions, and are perpendicular to the disks and extend radially from the shaft.

On the compressor side, in the space between the blades and the housing 257, a porous mat 253 fills a space under the disk annulus and next to the blades 284 and extends toward the housing. It is constructed of strong carbon fiber, not necessarily as strong as Hexcel IM6, in a pattern which retains its shape approximately under rotation.

The housing 257 has an annular opening around the shaft which is at a distance from the shaft less than the radius of the axial bore 268, which lets air/gas 251 enter the compressor. The porous mat 253 rotates with the shaft and rotors and lets air/gas 285 into the blade area through a larger opening in the shell 254 around the shaft 263. Air/gas enters at high axial speed, up to local speed of sound, spreads out inside the housing, slows down in axial velocity, and picks up rotational velocity from the porous mat before reaching the compressor blades 284, which are already moving at supersonic speeds even at the surface of the shaft. This causes the air/gas 285 to encounter the blades 284 at less than supersonic relative speeds, so that no shockwaves are generated. Relative to the fast moving rotor the air/gas flow 273 is radial and slow, also not likely to generate shockwaves.

Both ends of the shaft output exhaust 269, 286 from the expander rotor 289, 290, 262, 263, 271, 272, 282. The compressor and expander rotors are constructed of alpha SiC with flat blades 284, 272 approximately lying in planes containing the axis of rotation, said blades' inner edges pressed against the shaft and optional flexible blades. All sharp corners on the SiC are chamfered to 0.02 inch widths or greater. Three or more expander blades lay on the shaft on spaces between the holes 264, 271 through the shaft wall, and three or more compressor blades are similarly spaced. Wrappings of PAN carbon fiber 289, Hexcel IM6 at 12,000 fibers per tow, or Toho Tenax IMS60, 12000 fibers per tow, coated with a thin coating, optional nickel electroplating, while the fibers were under tension at 1% strain or approximately half the ultimate tensile stress, are wound around the blades compressing the blade to the shaft under the same 1% tension or greater. All hard part edges the fiber touches have edges radiused to at least 0.05 inch radius or larger. The windings compress the blades to approximately 200,000 psi toward the shaft. Some windings use holes not adjacent to the blade or wind around the shaft to make the blade resist sideways forces trying to tip the blade over. Windings around the blade outer edges provide 200,000 psi radial force per blade and windings including the shaft provide approximately 20,000 psi radial force per blade. These are the windings of the structural blades. The windings can be further thinly coated optionally by nickel electroplate. Flexible blades made without winding high compressive strength materials can be used. Examples of the high tensile strength tow include Hexcel IM6 12000 fiber tow, ultimate tensile strength 827,000 psi, specific gravity 1.76, or Hexcel IM9 12000 fiber tow, ultimate tensile strength 887,000 psi, specific gravity 1.8, or Toho Tenax IMS60, ultimate tensile strength 885,000 psi, specific gravity 1.79, or Amoco TI 000, ultimate tensile strength 1,002,000 psi, or Amoco T40. The Hexcel materials can be obtained from Hexcel Corporation's Salt Lake City Fibers Plant, located in West Valley City, Utah. The Toho materials can be obtained from Toho Tenax America, Inc. which has sales offices in Irvine, Calif., Braselton, Ga., and Mooresville, N.C. The Amoco materials can be obtained from Amoco Performance Products, Inc., from the Parma Technical Center in Ohio.

A ring 287, 290 made of fiber mat, metal mesh or porous ceramic, such as foamed fused Si, silica aerogel, carbon fiber or metal mesh capable of providing small flow channels or expanded honeycomb, lies concentric to the shaft around the blades 284, 272 and about 0.005 to 0.1 inches from the blades with an open annulus around the blades inside the ring. The ring has a significant compressive strength, finger pressure or higher, and its thickness does not create more compressive force than it can handle when rotating at top speed. Top speed on the outer surface of the ring is approximately 3157 feet/second. Carbon fibers 289 surround the ring circumferentially with pressure equal to the ring's rotating centrifugal force. The ring will occupy its working radius when the rotor spins. The ring 287, 290 has PAN carbon fiber anchoring it to the shaft, not shown, and will receive significant circumferential force from the air/gas passing through it. The ring allows air/gas 273 to flow through it radially at about 100 feet/second. The circumferential flow reaches approximately the ring speed as it proceeds through the ring. The ring comprises a porous ceramic or fibrous mat or metal mesh with small flow channels, or expanded honeycomb, and occupies the radial flow paths in the rotor beyond a radius close to the greatest radius of the rotor, and rotating with the rotor, such that all gas or air being compressed emerges through the ring and loses air or gas turbulence and circumferential pressure gradients in the ring, and emerges to near uniform supersonic circumferential speeds and near uniform subsonic radial speeds from the rotor. The ring acts as the final blade for the rotor and defines the Mach speed of the rotor as its supersonic circumferential speed, which should match the circumferential speed of air/gas 281 coming out and air/gas 274 going in. A small mismatch with the speed 274 is allowed; the ring will absorb the momentum, raising or lowering the temperature in the air/gas.

Non structural blades are added to reduce the pressure drop across structural blades. The non structural blades can be thin bonded sheets of near radial fibers which will cross at a small angle less than 30 degrees or ½ radian, with even thinner amounts of axial fibers bonded to it. These blades can start near the shaft, from ropes of PAN carbon fiber anchored to the shaft and reach the high tension windings around the structural blades, and/or at the high tension windings around all the blades and reach to the annulus around the structural blades.

The housing 257 is shaped like a thick walled tin can with the axis of rotation along the shaft axis, with holes passing the shaft through on both sides. Small disks 264 extend from the shaft and turn with the shaft next to the housing outer surface acting as radial pumps removing air/gas from the housing, on the expander side in all cases and on the compressor side when a vacuum is created outside the compressor rotor. Rotor sealing rings 255, 293 have a small gap between them and the rotating annuluses 254, 262 which also pump air/gas to higher radii, blocking backflow from the annuluses 279, 276. The surfaces next to the small gap may have grooves that enhance the pumping. Low density gas such as hydrogen can be introduced near the inner radius of rotor sealing ring 255, 293 to reduce drag in the gap. The hydrogen is not wasted if the engine burns fuel, it will burn.

The two annuluses 276, 279 around the rotors, which provide the supersonic 281 to subsonic 279 transitions 280 on the compressor side and the subsonic 276 to supersonic 274 transition 275 on the expander side, extend from very close to the rotor to a larger radius with subsonic flow. They are carved into insulation filling the housing from its maximum inner radius to the outer radii of the rotors in operation. The insulation or coatings on the insulation can contain the pressure in the annuluses 277, 278. The outer surface of the ring at the edge of the rotor is sealed except for a strip next to the opening into the annulus.

Each annulus at its outer radius reaches close to a wall spiraling out to vent 258, 260 in the insulation. The annulus on the expander side is larger than the annulus on the compressor side. The exit from the compressor annulus is in the form of approximately one spiral revolution to an outflow vent which may be rectangular at the beginning and may over a short distance convert to a round tube 259 which spirals around inside the insulation inside the housing going to larger radii and gradually moves toward the plane of the entrance to the expander annulus where it spirals inward and changes shape to match the entrance, becoming approximately rectangular.

The tube 259 is the ramjet engine combustion chamber; the annuluses replace the de Laval sonic converters of the ramjet engine, so approximately all the flow volume between the two rotors lies in a no choke area ramjet engine. The flow in the tube 259 can approach supersonic in places, so the length of the tube includes enough loops around the axis to guarantee enough time for fuel to be completely burned or heat to be exchanged. A long thin combustion chamber is a feature not found in other engines. Other tubes through the insulation 256 deliver fuel 291 to the combustion chamber/tube and have injection nozzles at their exits. An air/gas line 292 to the air bearings can parallel the fuel line with counter flow and heat the incoming fuel.

The annuluses have one of the shapes shown (FIGS. 7, 8, 9) and are surrounded by insulation 256, foamed fused silica or other insulation, for example, Cotronics M310, which is coated inside and further reinforced with a gas tight castable denser version of the same material 277, 278. The silica 256 is a material which has excellent thermal insulation and very high thermal shock resistance plus a low coefficient of thermal expansion. Cotronics M310 has good compressive strength, but the reinforcing material has 5 times higher compressive strength. The reinforcement covers the surface of the annuluses and the tubes between the annuluses and fills thin ditches cut into the primary insulation of the annulus for structural strength. The denser version is castable so it is used to cast reinforcing structural T-beams in the insulation.

The casting material can have carbon fiber added to it so that it acts like a short fur pelt which lies down in the flow and impedes the development of thick boundary layers in the flow. PAN carbon fiber is 4-6 microns thick and has a smooth surface which is smooth circular to within around $\frac{1}{30}$ micron or less. The overall fur cover may be around one thousandths of an inch thick when the fibers are bent down by the flow. The fur is useful where the flow is highest speed, which is also the colder part of the annulus. Regions of the surface which have temperatures above 1000° C. should be supplied with a different fiber such as a quartz fiber able to survive the temperatures.

The shaft is held by pad shaped air bearings 250, 265, such as New Age Bearings, outside the housing and mounted on the housing, which are driven by an external compressor.

These are preferably started before the shaft begins to rotate. Pressure can be supplied from the ramjet engine during operation by a small tube from the combustion chamber, although the pressure and temperature is high, its flow may be limited by a choke and it may be cooled by heating the fuel, if any. A load such as a high frequency electric generator 266, 267 can be put on the rotating shaft. An external vacuum pump can start to remove air 264 from the housing on the expander side.

To start the engine it may be useful in certain applications to block the ends of the shaft and the input vent 252 through the housing to keep air or gas from circulating while the rotors accelerate to start-up speed, which is a speed which will support combustion, then slowly open only the compressor side of the shaft until pressure appears on the expander exhaust 270, 271, then start combustion and open the input vent slowly. The temperatures in the engine are approximately independent of the air/gas rate of flow.

Figure 11:
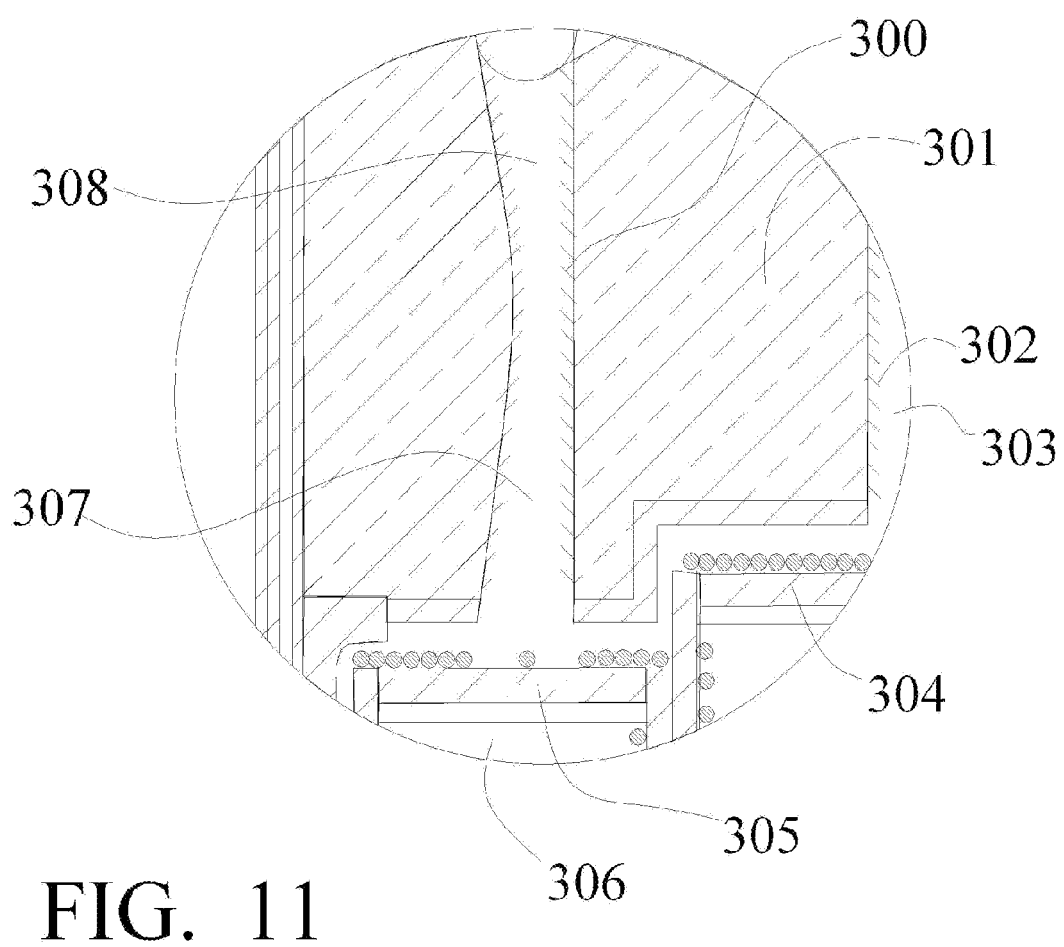
FIG. 11 is an enlarged cross-sectional view of an embodiment of an annulus of the invention, with the cross-section in a plane perpendicular to the axis of rotation of the rotor, showing surface fibers which are capable of minimizing boundary layer development.

FIG. 11 is an enlarged cross-sectional view of an embodiment of the annular spiral chambers, with the cross-section in a plane containing the axis of rotation of the rotor, showing surface fibers which are capable of minimizing boundary layer development. For ease of reference, various points of interest within FIG. 11 are referred to by the terms provided in Table 8.

TABLE 8

Reference for Points of Interest Labeled in FIG. 11

300. Fibers protruding from wall of compressor annular flow channel.
301. Thermal Insulation
302. Fibers protruding from wall of de-compressor annular flow channel.
303. Supersonic flow region of the annular flow channel of the de-compressor
304. Porous ring of de-compressor
305. Porous ring of compressor
306. Blade of compressor
307. Supersonic flow region of annular channel around compressor
308. Subsonic flow region of the annular flow channel around compressor In FIG. 11 is an enlarged cross-sectional view of the annular flow channels showing surface fibers for the purpose of minimizing boundary layer development. Protruding fiber 300, 302 from the wall of the annular flow channels 303, 307, 308 around the compressor 305 and de-compressor 304 are placed to act as a boundary layer minimizer. The fibers 300, 302 are smooth with a surface roughness less than a 0.030 of a micron. The fibers are about 4 to 6 microns in diameter and protrude more than 6 times their diameters from the surface of the wall of the flow channel. The fibers are separated from other fibers at the surface by one or more diameters. When flow occurs the fibers bend and protrude less than three diameters into the supersonic flow 307, 303, and into the subsonic flow 308. They can be formed out of PAN carbon fiber and imbedded in the wall material 301. In operation the flow generates on each individual fiber a boundary layer which grows in diameter along their length in the direction of flow. The larger the boundary layer the more the fiber bends toward the surface and the boundary layer terminates where the fiber terminates. Also shown in this enlarged view are the blade of the compressor 306 and the porous rings 304, 305 of the de-compressor and the compressor. They can be formed out of matted carbon fibers or porous matrix materials.

Not much has been said about the shaft, except that it has the highest specific tensile yield strength of ductile metals. Consequently the shaft is approximately the largest that can be built out of metal without reinforcement. The shaft hollow radius provides one of the power limiting factors of the design. If it were larger the inner surface would be moving above Mach 1. If air/gas flow into the compressor is through the shaft, then there is a wall separating inflow from outflow in the shaft, and thin walls are placed in the shaft to bring air/gas up to the rotational speed of the shaft. A stationary thin wall is placed inside the outflow section of the shaft to stop rotation of the exhaust with the shaft.

Larger shafts may be contemplated, however, if reinforced by high strength carbon fiber windings. One way to do this is by having channels cut into a high compressive strength cylinder of material, such as SiC, on the outer surface at 45 degree angles to surface lines parallel to the axis to a shallow depth, leaving square diamond outer surfaces untouched. Holes put through the shaft wall are cut inside the square diamond shapes and through the shaft wall. Coated carbon fiber is stretched to 1% elongation or more, and is wound into the channels, out one end of the shaft and looped around to return back through another channel and out the opposite end of the shaft, and the winding is repeated until all the channels are filled. The 45 degree wrap provides the required torque capacity of the shaft. More importantly, the wrap provides the hoop strength needed for high speed rotation. It also makes the total expansion of the shaft smaller.

Additional specific embodiments of the invention are outlined below. Features described herein may be optional depending on a particular application and/or desired result. For example, embodiments may comprise a supersonic rotor capable of accelerating or decelerating air or gas to angular velocity of the rotor during operation and capable of surface speeds of from about 2000 feet/second to about 5400 feet/second comprising: a shaft comprising high specific tensile yield strength material centered on an axis of revolution; structural compression material with high specific compressive strength on or around the shaft in a desired configuration, optionally in the form of blades; and a high specific tensile strength fiber tow for holding the compression material in the desired configuration during rotation of the shaft smaller.

Before rotation of the shaft and rotor during operation, the compression material can be pre-compressed with windings of the tow in loops around the compression material under high tension about one-half ultimate tensile strength with a force toward the axis and some windings capable to resist relative motion of parts and absorb tens of pounds of force per square inch directed circumferentially against the parts without significantly moving, and wherein, when rotating at Mach speeds, the force on a part toward the axis is near to maximum centrifugal force generated by the part during operation and the compression material remains in pre-compressed configuration due to the compression material expanding elastically because rotation reduces compression, making the fiber tow expand and put more force than the maximum centrifugal force on the compression material, holding the compression material firmly in place.

Embodiments can optionally comprise additional less rigid and more flexible parts comprising fiber tow reinforced with compressive strength material without winding under high tension, optionally with bonding materials or ceramics or metal applied to the fiber; and the parts are capable of scaling in size with no change in rotor surface speed during operation.

Devices according to the invention can have a rotor wherein the high specific tensile strength fiber tow comprises at least one of nanotube composite fiber, carbon fiber, glass fiber, metal and ceramic fiber, ceramic fiber, and polymer fibers; and/or wherein the structural compression material comprises at least one of alpha silicon carbide, boron carbide, ceramic, diamond like materials, metal, and polymer; and/or wherein the high specific tensile yield strength material for the shaft comprises at least one of alpha silicon carbide wound with carbon fiber coated with diamond like materials, steel worked by twisting on the shaft axis, titanium heat treated for maximum tensile yield strength, and metal or ceramic or polymer or any combination thereof.

Also included in the scope of the invention is a single-stage, nearly adiabatic radial centrifugal compressor comprising a supersonic rotor according to the invention, wherein parts attached to the shaft and capable of fast movement during rotation of the shaft are made of or held by the high specific tensile strength fiber tow; and/or wherein the shaft comprises axial hollows or bores centered on the axis of rotation, optionally having a solid portion near middle of the rotor, and comprises rotor radial vents through shaft walls into a blade volume of optionally structural and optionally flexible blades lying approximately in planes containing the axis with bases on or around the shaft, wherein the blades are capable of sweeping out the blade volume and optionally comprise the structural compression material and high specific tensile strength tow; wherein the blade volume is optionally further defined by rotor walls formed by two shells disposed at opposite sides of the blade volume near blade edges that extend outward from the shaft and extending to an outer shell radius of about outer blade edge radius, such that air or gas flow is capable of passing nearly radially through the blade volume between the blades and between the shells; a housing for at least a portion of the shaft and rotor comprising thermal insulation having: an annulus surrounding at least part of the rotor and having an inner radius close to the shaft, wherein the annulus is rotationally symmetric about the axis and is capable of receiving air or gas flow from the blade volume; a spiral chamber beginning at an outer radius of the annulus and comprising an outwardly spiral wall capable of blocking radial flow and opposing surfaces for bounding air or gas within the spiral chamber, which during operation of the rotor at supersonic speeds is capable of receiving outwardly spiraling air or gas flow from the annulus and delivering the flow to a vent; capable of producing compression ratios from about 10:1 up to 90:1 and higher from room temperature air; optionally capable of operating as an expander when flow and rotation are reversed.

Also included within the scope of the invention are compressors capable of producing locally subsonic flow output during operation of the supersonic rotor wherein: the opposing surfaces of the spiral chamber comprise shapes, optionally proportional to shapes in FIG. 7, FIG. 8, or FIG. 9, for producing, during operation, a smooth circumferential flow inversely proportional to a radius from the axis; the spiral chamber extends between a first radius near the rotor outer radius and a second radius, selected such that, during operation, a supersonic flow speed exists at the first radius and a desired local subsonic speed of flow is reached at the second radius; the spiral chamber has no choke area and does not have radial restraint of the flow where, during operation, the flow reaches local speed of sound; during operation, beyond the spiral chamber, the flow comprises a natural spiral flow shape matching the spiral outer wall of the spiral chamber and continues to a vent at subsonic speed, optionally venting from the housing; optionally capable of operating as an expander inputting locally subsonic flow when flow and rotation are reversed and having no choke area.

Compressor embodiments according to the invention can comprise means for adjusting to changing mass rate of flow comprising an adjustable strip or belt inside the spiral wall of the spiral chamber capable of being moved away from the spiral wall to match the natural spiral shape of the flow, which adjusts for different mass rates of flow below maximum.

Compressor embodiments according to the invention can comprise means for increasing expander efficiency whereby the two rotor shells reach the shaft and are capable of containing air or gas flow and exhausting the flow through the hollow shaft to cause all the air or gas to do similar work; wherein expander efficiency is compared with exhausting air or gas through annular openings around the shaft through the shell which allows some air or gas to leave at a larger radius and higher temperature than other air or gas, guaranteeing some loss of efficiency.

Also included within the scope of the invention are embodiments of ramjet engines, including a stationary or subsonic or supersonic ramjet engine isolating fastest parts from highest engine temperatures, and optionally without choke areas, comprising: a ramjet engine comprising an input de Laval nozzle, combustion chamber, and exhaust de Laval nozzle which is capable of supersonic flight in air or other gas at Mach M speeds in a particular air or gas atmosphere, where Mach M is below 7400 ft/s; any radial compressor described herein comprising a rotor capable of air or gas output at circumferential speeds of Mach $M/\sqrt{2}$, and of a size which produces a mass rate of flow greater than the ramjet engine, and having a locally subsonic vent output speed S1; wherein a portion of the input de Laval nozzle beginning at a cross section of the nozzle where subsonic flow speed is approximately S1 and continuing into the combustion chamber is capable of receiving compressor output and delivering the compressor output to the ramjet engine; wherein a portion of the input de Laval nozzle capable of higher speed flow is removed, including its choke area; during operation, air or gas entering the compressor is reduced to the mass rate of flow of the ramjet engine by blocking input flow area, and the adjustable strip or belt of the compressor spiral outflow region is adjusted to the changed mass rate of flow; optionally comprising any expander as described herein of appropriate size and having a locally subsonic design input speed S2 for gas or air with an energy level of gas or air output from the combustion chamber, at a greater flow volume capacity, for producing mechanical motion of a shaft and exhaust; wherein optionally a portion of the exhaust de Laval nozzle beginning at the combustion chamber and ending at a cross-section of the nozzle where locally subsonic flow speed is approximately S2 is capable of delivering exhaust from the ramjet engine to the expander; wherein optionally a portion of the exhaust de Laval nozzle capable of higher speed flow is removed or missing, including its choke area; wherein optionally the adjustable strip or belt of the spiral chamber of the expander is adjusted to the changed mass rate of flow; wherein maximum temperature in the compressor rotor and shaft is approximately an average of atmospheric temperature and compression stagnation temperature in the combustion chamber and maximum temperature in the optional expander rotor and shaft is approximately an average of exhaust temperature in the atmosphere and post heating stagnation temperature in the combustion chamber, making the compressor rotor about 450° C. below stagnation compression temperature, in one preferred embodiment, and the optional expander rotor about 675° C. below stagnation combustion temperature, and causing isolation of fast moving parts of the engine far from highest temperature areas of the engine; wherein each of the compressor, the remainder of the ramjet engine, and the optional expander has a housing capable of being fastened together to form one housing, or wherein the housings are capable of being attached to a common frame; capable of being stationary or subsonic or supersonic; capable of supersonic jet output with a complete exhaust de Laval nozzle without using an expander and without having an input de Laval nozzle choke area or other input choke area; optionally capable of providing all output power from an expander shaft with negligible net thrust and without any choke areas; optionally comprising output shaft power and added exhaust de Laval nozzles from the combustion chamber as subsonic to supersonic converters for exhaust creating thrust; optionally building the same design with other materials without starting with a complete ramjet engine.

Compressors and/or expander embodiments can comprise a circular ring at the outer edge of the rotor, capable of rotating with the rotor, comprising at least one of fiber mat, porous material, or metal mesh and comprising small flow channels and disposed in radial gas or air flow paths in the rotor beyond the radius of the outer blade edges, such that air or gas flow is capable of passing through the blade volume between the walls or shells and flowing through the ring, while losing turbulence and circumferential pressure gradients in the ring and emerging to near uniform supersonic circumferential speeds and near uniform subsonic radial speeds from the rotor; and an annular space centered on the axis inside the rotor and ring disposed around the blades.

Compressors and/or expander embodiments can comprise structural strength winding of carbon fiber surrounding structural strength blades at the outer blade edges, and surrounding the blade volume, and pressing each blade toward the shaft, so that the winding permits radial air or gas flow to pass at subsonic speeds; wherein the winding is distributed over a width of the outer blade edge of each blade and extends outward from the outer blade edge for blocking during operation pressure-driven high speed air or gas flow from one side of the blade to the other side over blade edges; capable of stopping shockwaves from being generated at the outer edges of the blade.

Compressors and/or expander embodiments can comprise very lightweight blades comprising PAN carbon fiber tow formed by: spreading the tow into long flat strips; wrapping the strips around a rectangular stretching frame made by wrapping coated carbon fiber around four smooth supports in a rectangle or polygon approximately blade size with one side designated as the outer blade edge, such that the strips form two sheets of fiber covering most of the rectangle or polygon on both sides and two ends of the strips extend from the side designated as the outer blade edge and in a direction close to perpendicular to the outer blade edge; pressing the two sheets of fiber together inside the frame to form a single thin sheet; applying a thin coating to the sheet optionally by electroplating; and removing the smooth supports from the frame; wherein the very lightweight blades are attached to the shaft or other parts of the rotor between the structural blades by way of loops through corners of the frame with the designated outer edge oriented toward the largest radius.

Compressors and/or expander embodiments can comprise means to stop flow from the annular chamber inward around the rotor whereby: the shells comprise outer surfaces facing the housing which are rotationally symmetric surfaces of revolution about the axis within about one-half inch or more of the shell outer radius; the insulation or housing comprises rings facing the outer surfaces of the shells and separated from the shells during operation by a gap of from about 0.0002 inch to 0.002 inch; and the surfaces optionally comprise grooves angled such that during operation of the rotor at Mach speeds the grooves and gap pump air or gas toward larger radiuses, deterring flow in an opposing direction around the rotor, and wherein the grooves are optionally formed by placement of windings.

Compressors and/or expander embodiments can comprise means for eliminating large boundary layers in supersonic speed flows whereby: the opposing surfaces capable of bounding air or gas within the annular chamber comprise short fibers embedded so that the fibers are capable of protruding into the flow and bending down toward the surfaces when high speed air or gas flow occurs parallel to the surfaces; the fibers have very smooth and very uniform circular cylindrical surfaces and diameters of about 4-6 microns; the fibers are separated by distances greater than their diameters; the fibers are capable of protruding into the flow more than about 3 times their diameters out of the opposing surfaces within the annular chamber; wherein during operation small boundary layers in the flow capable of forming on the fibers and growing wider along individual fibers in the direction of flow are redirected toward the nearby opposing surface by the bent down fibers and discontinued at the end of the fibers; rendering the fiber covering of the surface incapable of supporting a thick boundary layer.

Compressors and/or expander embodiments can comprise a rotor sealing ring disposed in the housing or other materials in the housing between the rotor and the annular chamber, wherein a small gap lies between the rotor sealing ring and the rotor; means for reducing drag whereby: low density gas, optionally hydrogen, is released inside the housing and outside the rotor; or one or more rotors has one or more outer shells capable of blocking axial flow of air or gas through the rotor but not radial flow through the outer radius of the rotor; the shell is surrounded by a partial vacuum between the shell and the housing or other materials in the housing or insulation and is not close to the housing or other materials in the housing out to a radius, R, a short distance from the outer blade radius of the rotor; beyond radius R the outer surface of the shell is a surface of revolution about the axis and comprises grooves; at Mach speeds, the outer surface of the shell beyond R lies a short distance from the rotor sealing ring; the rotor sealing ring and the outer surface of the shell are close enough together, and have oriented grooves, to pump the air or gas between the ring and the rotor to greater radii, blocking flow in an opposing direction and enhancing the vacuum between the housing and the rotor when operating; means for enhancing the vacuum chosen from: i) other surfaces mounted on the shaft are close to outer surfaces on the housing and are positioned and optionally grooved to pump air or gas out of the housing; ii) tubes aimed downstream in the supersonic flow beyond the rotor have openings which are flush with the opposing surfaces and extend through the insulation inside the housing and through the housing or materials inside the housing into the same vacuum volume, and the supersonic flow creates a very low pressure in the tube; iii) an external vacuum pump is connected to the same vacuum volume; such that, drag on the rotor is reduced and the efficiency of the rotor is increased by a small percent.

Ramjet engine embodiments in accordance with the invention can comprise means for prolonging combustion in the combustion chamber whereby: the combustion chamber has a length, up to thousands of times its width, appropriate for prolonged combustion; the combustion chamber is insulated against heat loss so as to provide during operation a negligible loss of energy or efficiency due to viscous heating because the flow, factoring out burning, is an approximately adiabatic Venturi flow in the combustion chamber and wherein temperature energy plus kinetic energy remain constant and transformation of kinetic energy to heat energy and transformation of heat energy to kinetic energy is not a loss of energy.

Ramjet engine embodiments in accordance with the invention can comprise means for reducing maximum temperature in the combustion chamber during operation at a subsonic flow rate in the combustion chamber while maintaining a constant fuel/air ratio whereby: the long combustion chamber comprises an internal flow area gradually increasing or reducing down the chamber which, as fuel is added during operation, is capable of gradually increasing air or gas flow toward local speed of sound and capable of reducing air or gas maximum temperature by up to around 270 degrees centigrade.

Ramjet engine embodiments in accordance with the invention can comprise ramjets capable of operating as a stationary ramjet engine without air or fuel comprising: means for providing inert gas or non-reacting gas for circulation in place of air through the compressor, ramjet engine, and expander, as working gas of the engine; means for radiating or conducting or supplying heat without chemical reaction into the combustion chamber to heat the working gas; means for re-circulating and cooling exhaust gas to a temperature close to or below atmospheric temperature before returning the exhaust gas to the input; means to increase output power by using heavier gas and optionally higher pressure than surrounding atmosphere; wherein the heating means is solar radiation or by heat exchange from an external combustion process or other heat generating reaction.

Stationary or subsonic or supersonic ramjet engines are also included, which comprise means for the expander to drive the compressor by having the compressor and expander on the same shaft; wherein the shaft of the compressor and expander are disposed on an axis and are separated so that all four ends of the hollow shaft portions can input or output air and are connected by a small diameter solid shaft on the axis extending into each shaft and supported by radial walls inside the compressor shaft and ending at a solid portion of the expander shaft near the middle of the expander rotor; or the shaft of the compressor is not hollow but is smaller diameter except near middle of the compressor rotor and air or gas is capable of being input through a cutaway volume of the shaft inside the housing and shells, and the compressor shaft extends into the expander shaft and is connected to a solid portion of the expander shaft near the middle of the expander rotor; or the compressor shares a portion of the shaft of the expander, optionally reduced in outer radius, without radial holes through the shaft wall into the compressor rotor area and air or gas is capable of being input through circular openings around the shaft through the housing and shells and the expander is capable of output through both ends of the expander hollow shaft; or both the compressor and the expander are on one hollow shaft with a solid portion of the shaft dividing their input and output flow areas.

Stationary or subsonic or supersonic ramjet engines are also included, which comprise means for increasing power whereby: a shell on the compressor rotor comprises a first opening at a radius to allow air or gas to enter on a side of the shell facing the housing; the housing facing the side of the shell on the compressor rotor comprises a second opening at a smaller radius; on the compressor rotor a porous material or fiber mat supported by high tension fiber tow windings fills the first opening and between the shell and the shaft and extends toward the housing and is capable of rotating with the shaft; the shaft of the compressor rotor and expander rotor is fully bored out and the radial vents from the expander blade volume are increased in flow area and the radial vents to the compressor blade volume are not present; wherein, during operation, flow from the expander is capable of exhausting through both ends of the shaft.

Engines comprising a compressor and expander according to the invention are also included, which may comprise a compressor rotor comprising structural compression material with compressive strength 560,000 psi and specific gravity 3.1, and a shaft comprising Ti beta-CEZ heat treated to have 220,000 psi yield tensile strength with specific gravity 4.69, and high tensile strength tow of 12000 fiber tow, ultimate tensile strength 827,000 psi, specific gravity 1.76, or 12000 fiber tow, ultimate tensile strength 887,000 psi, specific gravity 1.8, or, ultimate tensile strength 885,000 psi, specific gravity 1.79, or, ultimate tensile strength 1,002,000 psi; wherein the compressor rotor and the expander rotor are on the same shaft; radial vents connect the flow in the shaft bore to the expander rotor blade volume but not to the compressor rotor; portions of the shaft wall in the compressor region may be cut away without opening into the shaft bore to provide flow paths into the compressor rotor; the shell of the compressor rotor and the housing near the compressor both comprise open circular holes around the shaft to permit axial flow into the compressor rotor region in and around the shaft with a smaller holes on the housing than on the shell; the structural blades are slightly shorter than the shells, wherein, before rotating, the blades comprise windings from the shaft over the blades and back to the shaft to 190,000 psi compression in the blades and comprise windings circumferentially to 5,000 psi compression in the blades and to cover the outer blade edges, and wherein the outer blade edges are bonded metallically to the windings; between the outer blade edge radius and the outer shell radius, the rotor comprises a flow-through ring made of fiber mat, metal mesh, or porous ceramic, which is disposed within a few hundredths of an inch of the outer shell radius and in the space between the shells and is separated by about 0.005-0.1 inch from the blades by an annular open space, wherein the ring is held in place by windings over the rotor and around the shaft or by windings holding the shells to the shaft, and wherein the ring is capable of allowing radial flow of air or gas through the ring at hundreds of feet per second; a fiber mat or porous material fills the open circular hole in the compressor shell outside the shaft, extends toward the housing, rotates with the shaft and rotor, and is capable of adding rotational velocity to incoming air or gas during operation of the compressor; a surface on the shell of each of the compressor and expander rotors which faces the housing is a surface of revolution about the axis within about ½ inch of the outer shell radius, and rings with a surface matching and disposed facing the surface of revolution are disposed in the housing or other materials in the housing, so that, during operation, a gap of from about 0.0002 inch to 0.002 inch separates the shells from the rings, wherein the surfaces optionally comprise grooves angled such that, during operation of the rotor at Mach speeds, the gap and grooves pump air or gas toward larger radiuses, deterring flow in an opposing direction around the rotor, and wherein the annulus at the side of the expander is pumped to a vacuum by way of a gap and disk annulus comprising a surface with optional grooves which is disposed around the shaft outside and near the housing, and wherein tubes aimed downstream in the supersonic flow beyond the rotor are flush with the opposing surfaces and extend through the insulation inside the housing or through the housing or other material inside the housing into the same vacuum, and the supersonic flow creates a low pressure in the tube; the annular chambers of the compressor and expander are separate volumes of revolution around the shaft and the opposing surfaces of each annular chamber comprise smooth surfaces, optionally treated to minimize boundary layer development by way of small diameter fiber stubble capable of extending a few thousandths of an inch into the flow during operation; during operation, the air or gas leaves the compressor at Mach M circumferential speed and low radial velocity and spirals out into the annular chamber, losing speed and reaching local speed of sound at a radius within the annular chamber, and going beyond the radius within the annular chamber to local subsonic speed, and leaves the annular chamber for a single spiral revolution in the insulation, leading to a vent in the insulation; during operation, the air or gas travels through the vent and the vent changes to become a circular tube over a short distance in the vent, and the tube makes a spiral radially outward around the outer radius of the vent annular chamber of the compressor and goes to a radius larger than the annular chamber of the expander and then makes a spiral radially inward and connects to an input vent into the spiraling inward region around the annulus surrounding the expander; during operation, the air or gas is heated in the tube by combustion, or by adding steam, or by heat conduction from solar, or external combustion delivered by heat exchanger, or by particle bombardment, or by other heat generating reactions; during operation, the area of the input vent to the expander causes the flow to have the speed appropriate to expander input, and to have a spiral shape set by a movable wall in the input vent and spiral, and then to enter the expander annular chamber where the flow speeds up to match the rotor circumferential speed, greater than Mach M, at the exit from the annular chambers' least radius, with the smooth opposing surfaces within the annular chamber treated similar to the compressor annular chamber above, and to enter the rotor and spiral inward through the structural blades and their outer wrapping if any, and the optional additional lightweight blades in the rotor, and to eventually reach the holes through the shaft wall and to enter the hollow shaft; wherein, during operation, in the hollow shaft the flow is blocked from rotating by a flat blade which is stationary in the shaft and spans the length of the hollow shaft inside the expander rotor and beyond said rotor; wherein the flat blade stopping rotation raises the air or gas exhaust temperature which causes the air or gas to exit at up to local speed of sound from the two ends of the shaft; the shaft is positioned by air bearings mounted on the housing; the shaft does useful mechanical work such as turning a generator; optionally the exhaust heat is used to pre-heat fuel, heat buildings, or water, or is input into an air conditioning system that runs on heat, or has other heating uses which make the device more useful.

Engine embodiments also include an engine comprising: a compressor capable of accelerating air or gas to a flow with supersonic speed; a chamber capable of receiving and decelerating supersonic flow to subsonic speed; a chamber capable of receiving and accelerating subsonic flow to supersonic speed; an expander capable of decelerating air or gas to a flow to subsonic speed; wherein the compressor rotor and expander rotor are on one shaft; radial vents are in the expander portion of the shaft but not the compressor portion; wherein the compressor rotor is high specific compressive strength material with compressive strength 560,000 psi and specific gravity 3.1, and the shaft is Ti beta-CEZ heat treated to have 220,000 psi yield tensile strength with specific gravity 4.69, or fiber/metal composite or fiber/polymer composite, and the high tensile strength tow is 12000 fiber tow, ultimate tensile strength from 790,000 psi to 1,002,000 psi, specific gravity from 1.76 to 1.8.

Engine and compressor embodiments also include devices in which the compressor is capable of allowing air or gas to input to the compressor through cutaway volumes of the shaft inside the housing and shells; and/or the compressor has circular openings in the housing and shell facing the housing around the shaft capable of allowing air or gas to pass through the openings into the compressor, wherein the openings on the housing are smaller than the openings on the shell; and/or the structural blades are shorter than the radius of the shells and have windings providing 190,000 psi compression toward the shaft and 5,000 psi compression from circumferential windings, wherein the outer blade edges are bonded metallically to the windings; and/or between the outer blade edge radius and the outer shell radius, the compressor rotor comprises a flow-through ring made of fiber mat, metal mesh, or porous ceramic, which is disposed within a few hundredths of an inch of the outer shell radius and in the space between the shells and is separated by about 0.005-0.1 inch from the blades by an annular open space, wherein the ring is held in place by windings over the rotor and around the shaft or by windings holding the shells to the shaft, and wherein the ring is capable of allowing radial flow of air or gas through the ring at hundreds of feet per second; and/or a fiber mat or porous material occupies the circular openings in the compressor shell outside the shaft, extends toward the housing, rotates with the shaft and rotor, and is capable of adding rotational velocity to incoming air or gas during operation of the compressor; and/or a surface on the shell of each of the compressor and expander rotors which faces the housing is a surface of revolution about the axis within about ½ inch of the outer shell radius, and rings with a surface matching and disposed facing the surface of revolution are disposed in the housing or other materials in the housing, so that, during operation, a gap of from about 0.0002 inch to 0.002 inch separates the shells from the rings, wherein the surfaces optionally comprise grooves angled such that, during operation of the rotor at Mach speeds, the gap and grooves pump air or gas toward larger radiuses, deterring flow in an opposing direction around the rotor, and wherein the annulus of the expander is pumped to a vacuum by way of a gap and disk annulus comprising a surface with optional grooves which is disposed around the shaft outside and near the housing, and wherein tubes aimed downstream in the supersonic flow beyond the rotor are flush with the opposing surfaces and extend through the insulation inside the housing or through the housing or other material inside the housing into the same vacuum, and the supersonic flow creates a low pressure in the tube; and/or the annulus flow chambers of the compressor and expander are separate volumes of revolution around the shaft and the opposing surfaces of each annulus comprises fiber stubble with a diameter of about 4 to 6 microns capable of extending up to a few thousandths of an inch into the flow during operation; and/or during operation, the air or gas leaves the compressor at Mach M circumferential speed and low radial velocity and spirals out into the compressor annulus, losing speed and reaching local speed of sound at a radius within the compressor annulus, and going beyond that radius within the compressor annulus to local subsonic speed, and leaves the compressor annulus for a single spiral revolution in a chamber in the insulation, leading to a vent in the insulation; and/or during operation, the air or gas travels through the vent and the vent may change to a circular tube over a short distance in the vent, and the tube makes a spiral radially outward around the outer radius of the compressor and goes to a radius around the expander and then makes a spiral radially inward and connects to an input vent into the spiraling inward region around the expander.

The goals of this invention include cutting the use of fuels in all engine applications, from automobiles to jet and propeller aircraft to electric power generation, and cutting the production of $CO_2$ emissions, and dramatically reducing the cost of turbine-like engines. Improved efficiency automatically cuts fuel use. Doubling efficiency cuts fuel use in half. Tripling efficiency cuts fuel use by two-thirds. Today coal burning plants generate 2000 pounds of $CO_2$ at peak efficiency for one megawatt hour of electric power. An engine doubling the efficiency of power plant gas turbines running on natural gas reduces $CO_2$ production by 1450 pounds per megawatt hour compared to coal, and if the heat produced by the engine is used to heat buildings, replacing natural gas use by the building, the $CO_2$ reduction is 1633 pounds per megawatt hour, which is 82% of the $CO_2$ from coal burning electric generation. In one year, a one megawatt natural gas electric generator with cogeneration heating can stop 14,305,080 pounds of $CO_2$ being released into the atmosphere by offsetting the use of coal. The cost of the engine makes it practical to use the engine in automobiles, which has not been achieved with gas turbines in the past, even though gas turbines would greatly increase the efficiency of the average automobile engine, because of the high cost of gas turbines. This invention includes a rotary engine with continuous flow open from end to end and therefore turbine-like, but it is not a traditional turbine. In particular, at no time is turbulence necessarily increased in the air or gas in the engine, in fact the design reduces turbulence which may have been produced. Reducing turbulence is one of the criteria by which higher efficiency may be achieved.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

The invention claimed is:

1. An apparatus for interacting with air or gas, which is capable of operating as a compressor or as an expander, comprising:
   a housing;
   a shaft for transmitting torque extending through the housing, said shaft capable of rotating about an axis, and operably connected to a rotor;
   a rotor capable of being rotated at a sustained rotational rim speed of from about 2000 feet/second to about 5400 feet/second and operably configured so that air or gas is capable of flowing in a direction radially outward from within the shaft toward a rim of the rotor or radially inward from the rotor rim into the shaft and so that air or gas in the rotor is caused to approximately match rotational speed of the rotor at any radius;
   an annular region around the rotor and within the housing for providing a passageway for flow;
   wherein the housing further includes a flow vent configured to provide a passageway for high energy air or gas to flow outward from or inward to the annular region;
   wherein the shaft comprises high specific compressive or high specific tensile strength material, with some portion of the shaft wound by high specific tensile strength fiber tow windings stretched to around half of their ultimate tensile strength, and comprises flow passageways configured to allow flow of air or gas to or from the rotor;
   wherein the rotor surrounds a portion of the shaft inside the housing, comprises air or gas flow passageways configured to allow flow in radial directions and configured to block axial flow from the rotor, and comprises:
   high specific tensile strength material; and
   structural material of high specific compressive strength material under compression by high specific tensile strength fiber tow windings stretched to around half of their ultimate tensile strength, wherein the high specific compressive strength material is operably connected to the shaft by compression or by one or more of the fiber tow windings.

2. The apparatus according to claim 1, which is a compressor, wherein:
   the annular region around the rotor and within the housing is operably configured to provide a passageway for air or gas from the rotor to the flow vent of the housing, within which adiabatically compressing air or gas spirals radially outward from the rotor through the annular region, slows in speed, and increases in temperature;
   wherein the annular region is operably configured such that air or gas flow emerges radially outward from the rotor and at the rotor rim has a rotational speed which is approximately the locally supersonic rotational rim speed of the rotor and a radial speed which is locally subsonic relative to the shaft and rotor;
   wherein the annular region is operably configured such that air or gas flow emerging from the annular region is locally supersonic when an outer to inner radius ratio in the annular region is about 1 and is locally subsonic when an outer to inner radius ratio in the annular region is about 1.5 or greater.

3. The apparatus according to claim 2 capable of producing compression ratios in the range of about 10:1 to about 92:1 from room temperature air.

4. A jet engine comprising:
   the apparatus which is a compressor according to claim 2;
   a Venturi tube operably connected with the flow vent of the housing to receive a flow of air or gas from the vent, wherein the Venturi tube comprises or is operably connected to a device capable of using or interacting with at least a portion of the flow, which device is capable of adding energy to the flow and then removing energy from the flow to produce rotary mechanical work at least some of which is used to drive the shaft, and which device is capable of outputting the flow as a locally supersonic jet to produce thrust;
   wherein the device for producing thrust comprises:
   an input nozzle operably configured so that air or gas flow enters from the Venturi tube and slows to a target speed to produce a high compression temperature in the flow;
   a heating section operably configured so that it receives the flow from the input nozzle, wherein the flow is capable of being heated by conduction or wherein a material is capable of being injected into the flow to produce an exothermic reaction and add energy to the flow; and
   an output nozzle operably configured so that it receives the flow from the heating section and raises flow speed into locally supersonic flow capable of being output to produce thrust.

5. The jet engine according to claim 4, wherein:
   the input nozzle is a divergent nozzle which receives a high energy high temperature locally subsonic flow from the Venturi tube and outputs a slower locally subsonic flow at higher temperature;
   the heating section is operably configured so that it receives the locally subsonic flow from the divergent nozzle, heats the flow, and outputs a higher energy flow to the output nozzle; and
   the output nozzle is a de Laval nozzle which receives the heated locally subsonic flow from the heating section and converts the locally subsonic flow into locally supersonic flow for output as a locally supersonic jet.

6. The jet engine according to claim 4, wherein:
   the input nozzle is a de Laval nozzle which receives a high energy elevated temperature locally supersonic flow from the Venturi tube and converts the locally supersonic flow to a locally subsonic flow;

the heating section is operably configured so that it receives the locally subsonic flow from the de Laval nozzle, heats the flow, and outputs the flow to the output nozzle; and the output nozzle is a de Laval nozzle which receives the heated locally subsonic flow from the heating section and converts the locally subsonic flow into locally supersonic flow for output as a locally supersonic jet.

7. The jet engine according to claim 4, wherein:

the input nozzle is a convergent nozzle which receives a high energy elevated temperature locally supersonic flow from the Venturi tube, slows the flow while remaining locally supersonic, increases temperature of the flow to a target temperature, and outputs the locally supersonic flow;

the heating section is operably configured so that it receives the locally supersonic flow from the convergent nozzle, heats the flow, and outputs the locally supersonic flow to the output nozzle; and the output nozzle is a divergent nozzle which receives the heated locally supersonic flow from the heating section and increases the locally supersonic flow to a higher speed locally supersonic flow for output as a locally supersonic jet.

8. A mechanical engine comprising:

the apparatus which is a compressor according to claim 2;

a Venturi tube operably connected with the flow vent of the housing to receive a flow of air or gas from the vent, wherein the Venturi tube comprises or is operably connected to a device capable of using or interacting with at least a portion of the flow, which device is capable of adding energy to the flow and then removing energy from the flow to produce rotary mechanical work;

wherein the device for producing rotary mechanical work comprises:

an input nozzle operably configured so that it receives air or gas flow from the Venturi tube and slows the flow to a target speed to produce a high compression temperature in the flow;

a heating section operably configured so that it receives the flow from the input nozzle, wherein the flow is capable of being heated by conduction or wherein a material is capable of being injected into the flow to produce an exothermic reaction and add energy to the flow; and an expander operably configured so that it receives the flow from the heating section and removes energy from the flow to output rotational mechanical energy, wherein part of the mechanical output energy is used to rotate the shaft and rotor of the compressor.

9. The mechanical engine according to claim 8, wherein:

the input nozzle is a divergent nozzle capable of receiving a high energy high temperature locally subsonic flow from the Venturi tube and outputting a slower locally subsonic flow at higher temperature; and the heating section is operably configured so that it receives the locally subsonic flow from the input nozzle, heats the flow, and outputs a higher energy flow to the expander.

10. The mechanical engine according to claim 8, wherein:

the input nozzle is a de Laval nozzle which receives a high energy elevated temperature locally supersonic flow from the Venturi tube and converts the locally supersonic flow to a locally subsonic flow and outputs the flow to the heating section.

11. The mechanical engine according to claim 8, wherein:

the input nozzle is a convergent nozzle which receives a high energy elevated temperature locally supersonic flow from the Venturi tube, slows the flow while remaining locally supersonic, increases temperature of the flow to a target temperature, and outputs the locally supersonic flow;

the heating section is operably configured so that it receives locally supersonic flow from the convergent nozzle, heats the flow, and outputs the locally supersonic flow to the expander.

12. The apparatus according to claim 1, wherein the high specific tensile strength fiber tow is coated or infiltrated with metals or ceramics whereby a bonded or coherent flexible sheet or stiff surface is formed.

13. The apparatus according to claim 1, wherein the high specific tensile strength fiber tow comprises at least one of nanotube composite fiber, carbon fiber, glass fiber, metal and ceramic fiber, ceramic fiber, and polymer fibers, or any combination thereof.

14. The apparatus according to claim 1, wherein the high specific compressive strength material comprises at least one of alpha silicon carbide, boron carbide, ceramic, diamond like materials, metal, and polymer, or any combination thereof.

15. The apparatus according to claim 1, wherein during operation with an outward flow of air or gas the rotor comprises:

blades extending radially outward from the shaft and having an outer blade edge;

an annulus, which is an annular void, disposed radially outward from the blade edges and between the outer blade edges and a porous ring, wherein the annulus is operably configured to allow pressure in the flow to become approximately uniform even in the presence of any turbulence in the flow; and a porous ring disposed radially beyond the annulus and blades and operably configured to allow flow outward from between the blades through the porous ring while blocking axial flow from the ring, wherein the porous ring has an outer surface forming the rotor rim, such that during operation air or gas is capable of flowing from the shaft, between the blades, through the annulus to the porous ring where the air or gas is capable of passing through, rotating with, and emerging from the porous ring at about the rotational rim speed to produce an approximately uniform flow.

16. The apparatus according to claim 1, which is an expander, wherein:

the annular region is operably configured to provide a passageway for air or gas to flow inward from the flow vent of the housing to the rotor, within which adiabatically expanding air or gas spirals radially inward toward the rotor through the annular region, increases in speed, and lowers in temperature;

wherein the annular region is operably configured such that at the rotor rim the flow has a rotational speed which approximately matches the locally supersonic rotational rim speed of the rotor and a radial speed which is locally subsonic relative to the shaft and rotor; and wherein the annular region is configured such that a ratio of outer radius to inner radius is capable of providing locally supersonic flow to the rotor and when the flow changes from locally subsonic to locally supersonic within the annular region the largest ratio of outer radius to inner radius is close to 1.5.

* * * * *